US009090758B2

(12) United States Patent
Toosi et al.

(10) Patent No.: US 9,090,758 B2
(45) Date of Patent: Jul. 28, 2015

(54) PHASE CHANGE INK COMPRISING MODIFIED NATURALLY-DERIVED COLORANTS

(71) Applicant: Xerox Corporation, Norwalk, CT (US)

(72) Inventors: Salma Falah Toosi, Mississauga (CA); Mihaela Maria Birau, Mississauga (CA); C. Geoffrey Allen, Waterdown (CA); Caroline Turek, Mississauga (CA); Biby Esther Abraham, Mississauga (CA); Peter G. Odell, Mississauga (CA); Nathan Mark Bamsey, Burlington (CA); Gabriel Iftime, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 245 days.

(21) Appl. No.: 13/690,898

(22) Filed: Nov. 30, 2012

(65) Prior Publication Data
US 2014/0152748 A1 Jun. 5, 2014

(51) Int. Cl.
| C09D 11/02 | (2014.01) |
| C08K 5/42 | (2006.01) |
| C09D 11/34 | (2014.01) |
| C08K 5/00 | (2006.01) |
| C08K 5/19 | (2006.01) |

(52) U.S. Cl.
CPC . *C08K 5/42* (2013.01); *C09D 11/34* (2013.01); *C08K 5/0041* (2013.01); *C08K 5/19* (2013.01)

(58) Field of Classification Search
CPC ....................................................... C09D 11/34
USPC .......................................... 106/31.29, 31.61
See application file for complete search history.

(56) References Cited

U.S. PATENT DOCUMENTS

| 3,653,932 A | 4/1972 | Berry et al. |
| 4,251,824 A | 2/1981 | Hara et al. |
| 4,390,369 A | 6/1983 | Merritt et al. |
| 4,410,899 A | 10/1983 | Haruta et al. |
| 4,412,224 A | 10/1983 | Sugitani |
| 4,484,948 A | 11/1984 | Merritt et al. |
| 4,490,731 A | 12/1984 | Vaught |
| 4,532,530 A | 7/1985 | Hawkins |
| 4,601,777 A | 7/1986 | Hawkins et al. |
| 4,684,956 A | 8/1987 | Ball |

(Continued)

FOREIGN PATENT DOCUMENTS

| EP | 0187352 | 7/1986 |
| EP | 206286 | 12/1986 |

(Continued)

OTHER PUBLICATIONS

English abstract for German Patent Publication DE 4205636AL, Aug. 26, 1993, Griebel et al., 1 page.

(Continued)

*Primary Examiner* — Veronica F Faison
(74) *Attorney, Agent, or Firm* — Marylou J. Lavoie, Esq. LLC

(57) ABSTRACT

A phase change ink composition comprising an ink vehicle; an optional dispersant; and a modified naturally-derived colorant comprising a naturally-derived colorant that is modified with an aliphatic quaternary ammonium salt, an aromatic quaternary ammonium salt, or a mixture or combination thereof. The modified naturally-derived colorant is compatible with phase change ink vehicles.

20 Claims, 6 Drawing Sheets

(56) References Cited

U.S. PATENT DOCUMENTS

| | | |
|---|---|---|
| 4,851,045 A | 7/1989 | Taniguchi |
| 4,889,560 A | 12/1989 | Jaeger et al. |
| 4,889,761 A | 12/1989 | Titterington et al. |
| 5,006,170 A | 4/1991 | Schwarz et al. |
| 5,151,120 A | 9/1992 | You et al. |
| 5,194,638 A | 3/1993 | Frihart et al. |
| 5,195,430 A | 3/1993 | Rise |
| 5,221,335 A | 6/1993 | Williams et al. |
| 5,231,135 A | 7/1993 | Machell et al. |
| 5,372,852 A | 12/1994 | Titterington et al. |
| 5,496,879 A | 3/1996 | Griebel et al. |
| 5,597,856 A | 1/1997 | Yu et al. |
| 5,750,604 A | 5/1998 | Banning et al. |
| 5,780,528 A | 7/1998 | Titterington et al. |
| 5,782,966 A | 7/1998 | Bui et al. |
| 5,783,658 A | 7/1998 | Banning et al. |
| 5,827,198 A | 10/1998 | Kassal |
| 5,830,942 A | 11/1998 | King et al. |
| 5,919,839 A | 7/1999 | Titterington et al. |
| 6,174,937 B1 | 1/2001 | Banning et al. |
| 6,255,432 B1 | 7/2001 | Evans et al. |
| 6,281,172 B1 | 8/2001 | Warren et al. |
| 6,309,453 B1 | 10/2001 | Banning et al. |
| 6,472,523 B1 | 10/2002 | Banning et al. |
| 6,476,219 B1 | 11/2002 | Duff et al. |
| 6,547,380 B2 | 4/2003 | Smith et al. |
| 6,576,747 B1 | 6/2003 | Carlini et al. |
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,858,070 B1 | 2/2005 | Wong et al. |
| 6,860,930 B2 | 3/2005 | Wu et al. |
| 6,893,479 B2 | 5/2005 | Eswaran et al. |
| 6,906,118 B2 | 6/2005 | Goodbrand et al. |
| 6,958,406 B2 | 10/2005 | Banning et al. |
| 7,053,227 B2 | 5/2006 | Jaeger et al. |
| 7,381,831 B1 | 6/2008 | Banning et al. |
| 7,407,539 B2 | 8/2008 | Wu et al. |
| 7,427,323 B1 | 9/2008 | Birau et al. |
| 7,629,701 B2 | 12/2009 | Campanile et al. |
| 7,973,186 B1 | 7/2011 | Goredema et al. |
| 8,118,922 B2 | 2/2012 | Goredema et al. |
| 8,273,166 B2 | 9/2012 | Birau et al. |
| 8,616,693 B1 * | 12/2013 | Toosi et al. .............. 347/99 |
| 2003/0101902 A1 * | 6/2003 | Reitnauer et al. .......... 106/31.31 |
| 2014/0155625 A1 * | 6/2014 | Birau et al. ................. 548/457 |

FOREIGN PATENT DOCUMENTS

| | | |
|---|---|---|
| GB | 2238792 | 6/1991 |
| GB | 2290793 | 1/1996 |
| GB | 2294939 | 5/1996 |
| GB | 2305670 | 4/1997 |
| GB | 2305928 | 4/1997 |
| WO | WO 94/04619 | 3/1994 |
| WO | WO 94/14902 | 7/1994 |
| WO | WO 95/04760 | 2/1995 |
| WO | WO 96/14364 | 5/1995 |
| WO | WO 97/12003 | 4/1997 |
| WO | WO 97/13816 | 4/1997 |
| WO | WO 9733943 | 9/1997 |

OTHER PUBLICATIONS

English abstract for German Patent Publication DE 4205713AL, Aug. 26, 1993, Griebel et al., 1 page.

Mihaela Maria Birau, et al., U.S. Appl. No. 13/690,857, filed Nov. 30, 2012, entitled "Modified Naturally-Derived Colorants for Phase Change Ink Applications," not yet published, 49 pages, 1 drawing sheet.

Salma Falah Toosi, et al., U.S. Appl. No. 13/690,941, filed Nov. 30, 2012, entitled "Phase Change Ink Comprising Colorants Derived From Plants and Insects," not yet published, 58 pages, 1 drawing sheet.

* cited by examiner

PHASE CHANGE INK COMPRISING MODIFIED NATURALLY-DERIVED COLORANTS

RELATED APPLICATIONS

Commonly assigned U.S. patent application Ser. No. 13/690,857, entitled "Modified Naturally-Derived Colorants For Phase Change Ink Applications", filed concurrently herewith, which is hereby incorporated by reference herein in its entirety, describes modified naturally-derived colorants suitable for use in phase change or solid inks.

Commonly assigned U.S. Pat. No. 8,616,693, entitled "Phase Change Ink Comprising Colorants Derived From Plants And Insects", filed concurrently herewith, which is hereby incorporated by reference herein in its entirety, describes phase change inks including a modified naturally-derived colorant wherein the naturally-derived colorant is a colorant derived from a plant, a colorant derived from an insect, or a mixture or combination thereof.

BACKGROUND

Disclosed herein is a phase change ink composition comprising a modified naturally-derived colorant and a process for preparing and using same, wherein the modified naturally-derived colorant comprises a naturally-derived colorant that is modified with an aliphatic quaternary ammonium salt, an aromatic quaternary ammonium salt, or a mixture or combination thereof; wherein the modified naturally-derived colorant is compatible with phase change ink vehicles.

In general, phase change inks (sometimes referred to as solid inks or "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes.

The colorants can also include pigments, as disclosed in, for example, U.S. Pat. No. 5,221,335, the disclosure of which is totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Ink jetting devices are known in the art, and thus extensive description of such devices is not required herein. As described in U.S. Pat. No. 6,547,380, which is hereby incorporated herein by reference in its entirety, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, which is hereby incorporated herein by reference in its entirety, the image is applied by jetting appropriately colored inks during four to eighteen rotations (incremental movements) of a substrate (an image receiving member or intermediate transfer member) with respect to the ink jetting head, i.e., there is a small translation of the print head with respect to the substrate in between each rotation. This approach simplifies the print head design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Thermal ink jet processes are well known and are described, for example, in U.S. Pat. Nos. 4,601,777, 4,251,824, 4,410,899, 4,412,224 and 4,532,530, the disclosures of each of which are hereby incorporated herein.

As noted, ink jet printing processes may employ inks that are solid at room temperature and liquid at elevated temperatures. For example, U.S. Pat. No. 4,490,731, which is hereby incorporated by reference herein, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of non-printing without the danger of nozzle clogging, even without capping the nozzles.

Examples of the phase change inks herein are inks that include an ink vehicle that is solid at temperatures of about 23° C. to about 27° C., for example room temperature, and specifically are solid at temperatures below about 60° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C.

In this regard, the inks herein may be either low energy inks or high energy inks. Low energy inks are solid at a temperature below about 40° C. and have a viscosity of from about 1 to about 20 centipoise such as from about 5 to about 15 centipoise, for example from about 8 to about 12 cp, at a jetting temperature of from about 60° C. to about 100° C. such as about 80° C. to about 100° C., for example from about 90° C. to about 100° C. High energy inks are solid at a temperature below 40° C. and have a viscosity of from about 5 to about 15 centipoise at a jetting temperature of from about 100° C. to about 180° C., for example from 120° C. to about 160° C. or from about 125° C. to about 150° C.

While certain colorants suitable for use in phase change inks are known, an increase in the range of colorants suitable for use in phase change inks is desirable.

U.S. patent application Ser. No. 13/008,783, filed Jan. 18, 2011, of Maria Birau, et al., entitled "Phase Change Ink Compositions And Colorants For Use In The Same," which is hereby incorporated by reference herein in its entirety, describes in the Abstract thereof phase change ink compositions comprising a novel colorant wax to prevent and/or reduce print head and nozzle contamination in ink jet printers caused by drooling and faceplate staining. In particular, there is provided novel colorants containing acid groups for use in phase change ink compositions and which are compatible with phase change ink components.

Natural colorants, for example, Alizarin and Indigo, are desirable as bio-friendly or "green" colorants, but are not suitable for use in phase change ink vehicles due to the difficulty of dispersing such colorants owing to their large particle size and lack of functionality to enable dispersant attachment to the pigment particle. Sulfonated analogs of naturally-derived colorants contain functionality but are typically difficult to disperse in low polarity solid ink vehicles. Further, residual salts from these compounds can precipitate out from the ink in the print head and form undesirable salt rings around the ink jet orifices thus hindering reliable jetting performance.

While known compositions and processes are suitable for their intended purposes, a need remains for improved colorants, and more specifically, for improved colorants suitable for use in phase change inks. Additionally, a need remains for improved colorants suitable for use in phase change inks that are natural or derived from natural sources and thus environmentally friendly. There is further a need for phase change ink compositions containing composite materials suitable that contain natural-based materials and/or materials that are biodegradable.

The appropriate components and process aspects of the each of the foregoing U.S. patents and patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink composition comprising an ink vehicle; an optional dispersant; and a modified naturally-derived colorant comprising a naturally-derived colorant that is modified with an aliphatic quaternary ammonium salt, an aromatic quaternary ammonium salt, or a mixture or combination thereof. The modified naturally-derived colorant is compatible with phase change ink vehicles.

Also described is a method for preparing a phase change ink composition comprising combining an ink vehicle; an optional dispersant; and a modified naturally-derived colorant comprising a naturally-derived colorant that is modified with an aliphatic quaternary salt, an olephenic quaternary salt, an aromatic quaternary salt, or a mixture or combination thereof, an optional fluorescent dye, and an optional synergist, to produce a phase change ink composition.

Also described is a method comprising incorporating into an ink jet printing apparatus a phase change ink composition comprising an ink vehicle; an optional dispersant; and a modified naturally-derived colorant comprising a naturally-derived colorant that is modified with an aliphatic quaternary salt, an olephenic quaternary salt, an aromatic quaternary salt, or a mixture or combination thereof, an optional fluorescent dye, and an optional synergist; melting the ink composition; and causing droplets of the melted ink to be ejected in an imagewise pattern onto a substrate.

Also described is an ink jet printer stick or pellet a phase change ink composition comprising an ink vehicle; an optional dispersant; and a modified naturally-derived colorant comprising a naturally-derived colorant that is modified with an aliphatic quaternary salt, an olephenic quaternary salt, an aromatic quaternary salt, or a mixture or combination thereof, an optional fluorescent dye, and an optional synergist.

DETAILED DESCRIPTION

Figure 1:
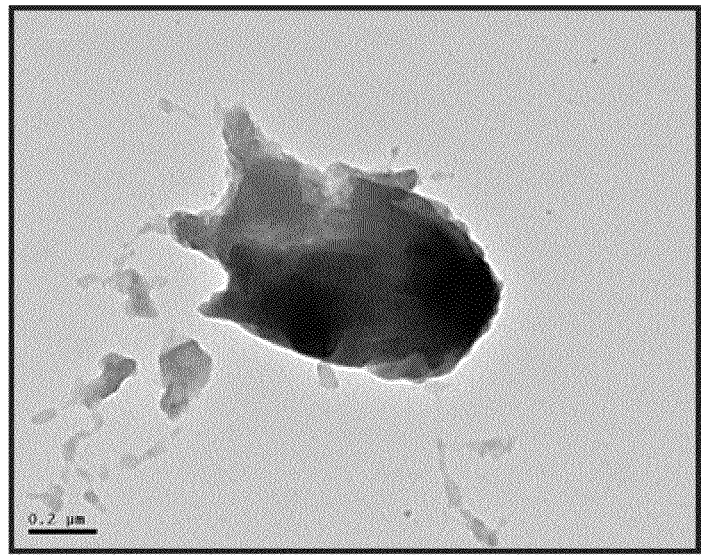
FIG. 1 is a transmission electron micrograph image showing non-modified indigo carmine.

Described is a phase change ink composition comprising an ink vehicle; an optional dispersant; and a modified naturally-derived colorant. The modified naturally-derived colorant comprises a naturally-derived colorant that is modified with an aliphatic quaternary ammonium salt, an aromatic quaternary ammonium salt, or a mixture or combination thereof; wherein the modified naturally-derived colorant is compatible with phase change ink vehicles. In embodiments, the naturally-derived colorant is a pigment, a dye, or a mixture or combination thereof. In certain embodiments, the naturally-derived colorant is a pigment. In other embodiments, the naturally-derived colorant is a dye.

Natural, naturally-derived or "natural like" colorant as used herein can be described as colorants that exist in nature but having a structure which has been functionalized to add functional groups that the original structure does not have or a synthetically prepared compound that has the structure of a naturally occurring colorant. Some natural or naturally-derived colorants including pigments and dyes are known for their thermal stability and good light fastness. It is desirable to be able to use natural or naturally-derived colorants in solid ink.

Natural colorants (consisting of dyes and pigments) can be derived from natural sources all over the world including from plants, animals and microorganisms such as bacteria that extract the colorant of various materials. Most natural colorants fall into 6 general classes which include tetrapyrroles, tetra-terpenoids, quinines, O-heterocyclic compounds, N-heterocyclic compounds and metallo-proteins. Examples of tetrapyrroles include porphyrins and porphyrin derivatives and more specifically, chlorophylls, heme pigments and bilins. Examples of tetra-terpenoids or carotenoids include carotenes and xanthophylls. Examples of quinines include benzoquinones, anthraquinones and naphthiquinones. Examples of O-heterocyclic compounds such as flavonoids include anthocyanins and flavonols. Examples of N-heterocyclic compounds include indigoids and indole derivatives, such as betalaines and eumelanins, and substituted pyrimidines such as pterins and purines. Examples of metalloproteins, such as oligomeric proteins, include iron-based proteins such as haemerythrin and myohemerythrin which exhibit color in an oxygenated state. Other examples of natural colorants include lipofuscins and fungal pigments. In embodiments herein, the naturally-derived colorant is derived from a member of the group consisting of tetrapyrroles, tetra-terpenoids, quinines, O-heterocyclic compounds, N-heterocyclic compounds, metallo-proteins, lipofuscins, and fungal pigments.

Natural colorants have or can be made to have a variety of colors with or without metal complexing agents such as magnesium and iron and/or with or without the use of a mordant such as alum, tin, stannous chloride, copper sulfate and the like. Some natural colorants are prone to oxidation which can result in the natural colorant having a different color before it was oxidized. Described herein are examples of mixtures of modified naturally derived pigments and dispersants that when incorporated into phase-change inks impart a grayish or metal-like appearance on a print such as a print on white paper.

Examples of red dyes from natural sources include those from Safflower (*Carthamus tinctorius*), Caesalpina (*Caesalpina sappan*), Maddar (*Rubia tinctorum*), Kermes (*Kermes vermilio*), Drago tree (*Dracaena draco*), Daemonorops (*Daemonorops draco*), Cochineal (*Dactylopiuscoccus coccus*) and Lac (*Coccus lacca*). Examples of yellow dyes from natural sources include those from Bougainvillea (*Bougainvillea glabra*), Golden rod (*Solidago grandis*), Teak (*Tectona grandis*), Marigold (*Tagetes* species), Weld (*Reseda luteola*), Saffron (*Crocus sativus*) and Parijata (*Nyetanthasar bortristis*). Examples of blue or blue-like (such as purple) dyes from natural sources include those from Indigo (*Indigofera tinctoria*), Woad (*Isatis tinctoria*), Suntberry (*Acacia nilotica*), Pivet (*Ligustrum vulgare*), molluscs such as *Bolinus brandaris, Hexaplex trunculus* and *Stramonita haemastoma*, Murasaki (*Lithospermum erythrorhizon*) and Water lily (*Nymphaea alba*). Examples of green dyes from natural sources include those from Tulsi (*Ocimum sanctum*), Bougainvillea (*Bougainvillea glabra*), Canna, Lily (*Convallaria majalis*) and Nettles (*Urtica diocia*). Examples of orange or orange-like dyes from natural sources include those from Bougainvillea (*Bougainvillea glabra*), Balsam (*Impatiens balsamina*), Dahlia (*Dahlia species*) and Annatto (*Bixa orellana*). Examples of brown dyes from natural sources include those from Caesalpina (*Caesalpina sappan*), Bougainvillea (*Bougainvillea glabra*), Balsam (*Impatiens balsamina*), Marigold (*Tagetes* species), Balsam (*Impatiens balsamina*) and Blackberries (*Rubus fructicosus*). Examples of black dyes from natural sources include those from Lac (*Coccus lacca*), Alder (*Almus glutinosa*), Rofblamala (*Loranthus pentapetalus*), Custard apple (*Anona reticulata*) and Harda (*Terminalis chebula*). In embodiments, the naturally-derived colorant is derived from a member of the group consisting of Safflower, Caesalpina, Maddar, Kermes, Drago tree, Daemonorops, Cochineal, Lac, Bougainvillea, Golden rod, Teak, Marigold, Weld, Saffron, Parijata, Indigo, Woad, Suntberry, Pivet, molluscs, Murasaki, Water lily, Tulsi, Canna, Lily, Nettles, Balsam, Dahlia, Annatto, Balsam, Blackberries, Lac, Alder, Rofblamala, Custard apple, Harda, and mixtures and combinations thereof.

To achieve a desired color or effect, two or more natural colorants may be mixed together in any proportion to achieve that desired color or effect. It is also known that two or more natural colorants may be present in a given natural colorant compound.

Natural colorants such as indigo, referenced as C.I. Pigment Blue 66, C.I. Vat Blue 1 and C.I. Reduced Vat Blue 1 (all listed as C.I. 73000) and its variants thereof, and alizarin, referenced as C.I. Mordant Red 11 (listed as C.I. 58000) and their variants thereof are known as "ancient blues" and "ancient reds", respectively, and played important roles as colorants for several ancient civilizations. In embodiments herein, various naturally-derived pigments, such as indigo and alizarin, were derivatized such that they became compatible and dispersible within phase change ink vehicles.

The natural or naturally-derived colorants can be obtained from natural sources or obtained commercially. Naturally-derived colorants herein can include colorants that were originally natural or bio-based colorants that were modified from their natural state but not suitable as modified for use in phase change inks. These naturally-derived colorants can be modified as described herein to provide modified naturally-derived colorants suitable for use in phase change inks.

Figure 2:
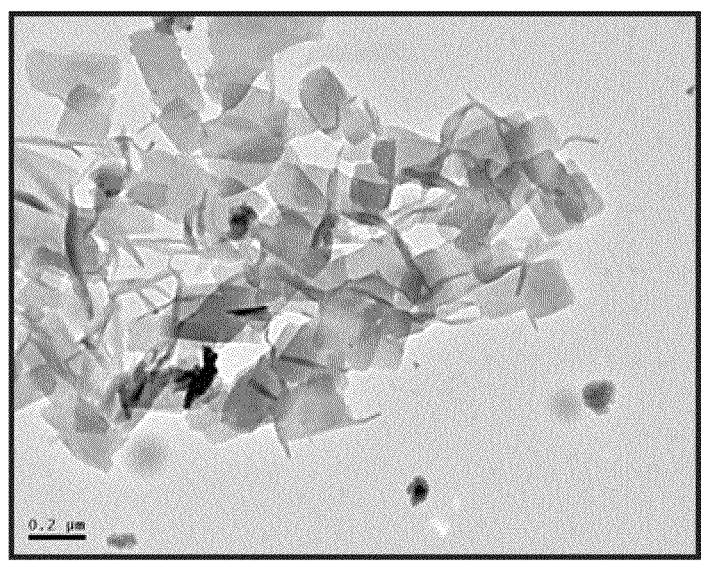
FIG. 2 is a transmission electron micrograph image showing modified indigo carmine in accordance with an embodiment of the present disclosure.

In embodiments, a naturally-derived colorant, in embodiments, a pigment, that had been modified to contain a sodium atom (or any other Group I alkali metal, especially potassium) was modified in accordance with the present disclosure to replace the sodium atom with a long chain alkyl quaternary ammonium salt. In embodiments, this modification provided a reduction in the particle size of the pigment. In embodiments, modifying Indigo Carmine with N,N-dimethyldioctadecylammonium bromide provided a reduction in the pigment particle size from an original particle size of more than about 2 micrometers to an after-modification particle size of less than about 300 nanometers in length (or long axis or longest dimension of particle) as determined by Transmission Electron Microscopy (TEM). FIG. 1 shows a TEM picture of non-modified indigo carmine. FIG. 2 shows a TEM picture of indigo carmine modified with N,N-dimethyldioctadecylammonium bromide. Non-modified indigo pigments are characterized by irregular shaped agglomerates of poorly defined primary particles. These agglomerates are typically in excess of about 2 micrometers in diameter. The modified indigo pigments of the present disclosure are characterized by well-defined rectangular-shaped primary particles ranging from about 150 nanometers to about 200 nanometers along the long axis of the particle.

The inventors believe that the present modified naturally-derived pigments are novel compounds. The modified naturally-derived colorants, in embodiments, modified naturally-derived pigments, are suitable for use in phase change ink vehicles and can be used to develop spot and secondary colors, such as orange and violet, although not limited to these colors.

Natural colorants such as indigo and alizarin have been known as "ancient blues" and "anthraquinone reds." In embodiments herein, various naturally-derived pigments, such as indigo and alizarin, were derivatized such that they became compatible and dispersible within phase change ink vehicles.

In embodiments, sulfonated pigments having a base structure derived from natural pigments are derivatized to become compatible with solid ink and dispersible in solid ink. For example, a sulfonated pigment having a sodium counter ion can be modified by displacing the sodium counter ion with a long chain alkyl quaternary ammonium salt which can also aid in the reduction of the particle size of the pigment. In embodiments, the long alkyl chains can also be biobased. The present novel modified naturally-derived colorants can be developed into different colors such as by using different dispersants for the same colorant.

In embodiments, the modified naturally-derived colorant herein is derived from indigo of the formula

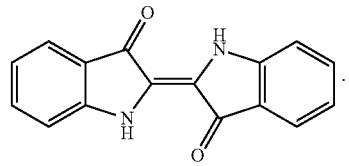 [SMILES: O=C1/C(=C2\Nc3ccccc3C2=O)Nc2ccccc21]

In other embodiments, the modified naturally-derived colorant can also be derived from indirubin (also known as Indigo Red (CAS No. 75790)) of the formula

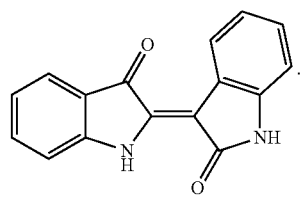 [SMILES: O=C1Nc2ccccc2/C1=C1/Nc2ccccc2C1=O]

In still other embodiments, the modified naturally-derived colorants can also be derived from indigoids and indirubinoids including those of the formulae

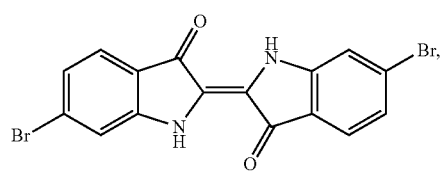

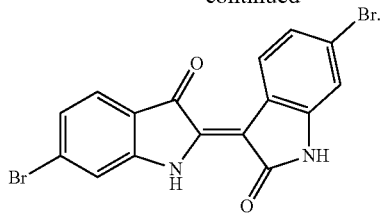

In other embodiments, the modified naturally-derived colorant herein is derived from alizarin or anthraquinone red of the formula

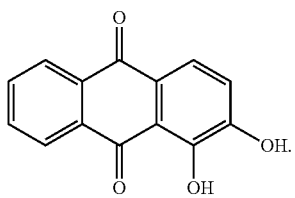 [SMILES: O=C1c2ccccc2C(=O)c2c1ccc(O)c2O]

In other embodiments, the modified naturally-derived colorant can also be derived from Alizarin purpurin (referenced as C.I. Natural Red 8 and C.I. Natural Red 16 and listed as C.I. 75410 and also known as Indigo Red) of the formula

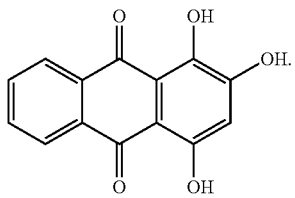 [SMILES: O=C1c2ccccc2C(=O)c2c(O)c(O)cc(O)c21]

Included in further embodiments, the modified naturally-derived colorants can also be derived from naturally occurring anthraquinoids such as in Table 1 as related to the formula

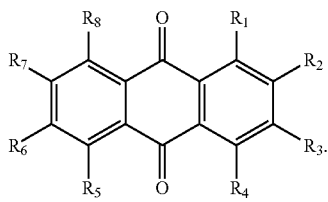

TABLE 1

| Chemical Structures of Naturally Occurring Anthraquinoids | | | | | | | | |
|---|---|---|---|---|---|---|---|---|
| Dye | Substituents | | | | | | | |
| Component | $R_1$ | $R_2$ | $R_3$ | $R_4$ | $R_5$ | $R_6$ | $R_7$ | $R_8$ |
| Madder Plant | | | | | | | | |
| Alizarin | OH | OH | | | | | | |
| Purpurin | OH | OH | | OH | | | | |

TABLE 1-continued

| Chemical Structures of Naturally Occurring Anthraquinoids | | | | | | | | |
|---|---|---|---|---|---|---|---|---|
| Dye | Substituents | | | | | | | |
| Component | $R_1$ | $R_2$ | $R_3$ | $R_4$ | $R_5$ | $R_6$ | $R_7$ | $R_8$ |
| Insects | | | | | | | | |
| Carminic acid | $CH_3$ | COOH | OH | | OH | OH | (c) | OH |
| Flavokermesic acid | $CH_3$ | COOH | OH | | | OH | | OH |
| Kermesic acid | $CH_3$ | COOH | OH | | OH | OH | | OH |
| Laccaic acid A | COOH | COOH | OH | | OH | OH | (a) | OH |
| Laccaic acid B | COOH | COOH | OH | | OH | OH | (b) | OH |

The (a), (b) and (c) designations in Table 1 refer to the following formulae

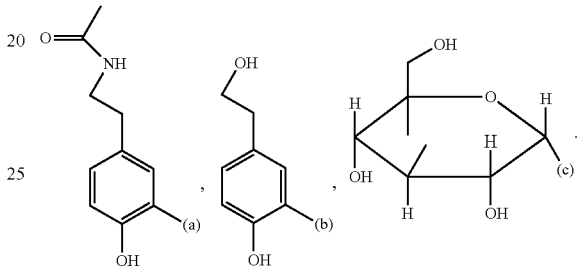

The modified naturally-derived colorants herein can be derived from sulfonated compounds. In embodiments, the present modified naturally-derived colorants are derived from sulfonated indigo carmine having sodium counter ions (also known as Indigotine) of the formula

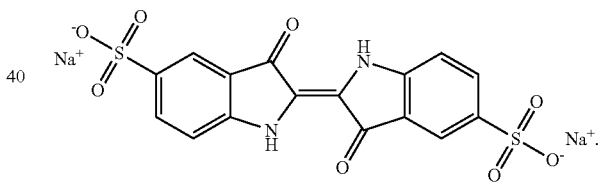

Other embodiments include the modified naturally-derived colorants derived from a sulfonated indigo known as disodium 2-(1,3-dihydro-3-oxo-7-sulphonato-2H-indol-2-ylidene)-3-oxoindoline-5-sulphonate (CAS No. 27414-68-2) of the formula

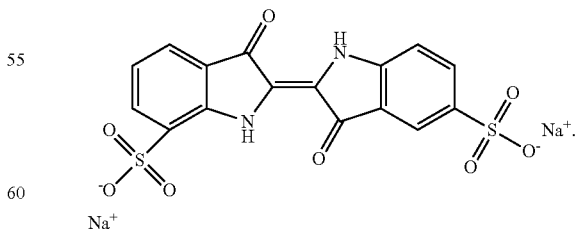

In other embodiments, the modified naturally-derived colorants can also include indigo pigments having degrees of sulfonation of 3 or 4 and having potassium counterions of the formulae

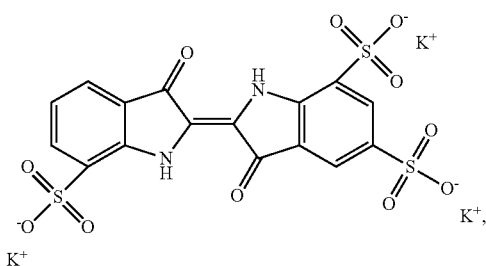

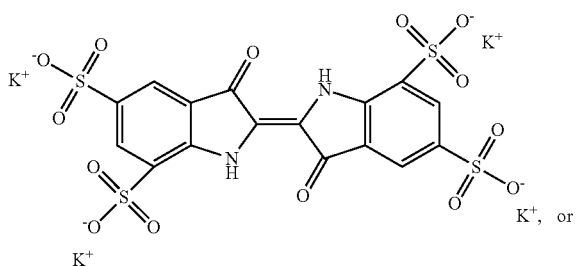

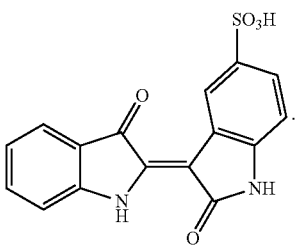 [SMILES: O=C1Nc2ccc(S(=O)(=O)O)cc2/C1=C1/Nc2ccccc2C1=O]

In yet other embodiments, the modified naturally-derived colorants can be derived from sulfonated indirubin including Indirubin-5-sulfonic acid (CAS No. 864131-82-8) and salts of same where the free acid has the formula

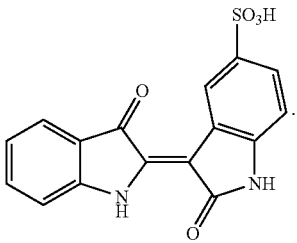

In other embodiments, the present modified naturally-derived colorants are derived from sulfonated Alizarin Red S having a sodium counter ion of the formula

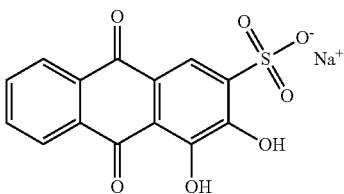 [SMILES: O=C1c2ccccc2C(=O)c2c1cc(S(=O)(=O)[O-])c(O)c2O ; [Na+]]

In other embodiments, the modified naturally-derived colorants can be derived from Purpurin sulfonate (CAS No. 6486-90-4) having a sodium counter ion of the formula

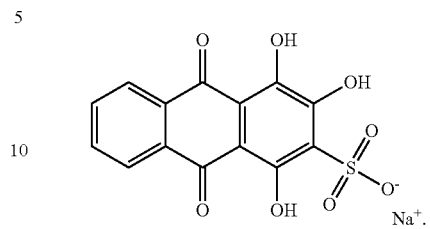

Sulfonated compounds are commercially available, for example, under the name of "Indigo Carmine" and "Alizarin Red S" from Sigma-Aldrich®.

In other embodiments, the sulfonates' counterions of the naturally-derived colorants can be sodium and/or potassium.

The modified naturally-derived colorants herein include a modifying component that renders the natural or naturally-derived colorants suitable for use in solid ink. In embodiments, certain naturally-derived colorants are modified by replacing the sodium therein with a quaternary ammonium alkylated or olephenic group which renders the modified naturally-derived colorant dispersible in in solid ink vehicles and further eliminates the risk of salt precipitation inside the print head.

Any suitable or desired aliphatic, olephenic, or aromatic quaternary salt, or mixture or combination thereof can be selected in embodiments herein.

In embodiments, the naturally-derived colorant is modified with a compound of the formula

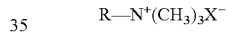

R—N⁺(CH₃)₃X⁻ wherein R is a long chain alkyl group having at least 8 carbon atoms and X is a halogen.

In embodiments, the modified naturally-derived colorants herein include a modifying component that is an aliphatic quaternary ammonium salt or aromatic quaternary ammonium salt and mixtures thereof and any suitable halide such as chlorine, bromine or iodine. Suitable N-alkyl/aryl counterions to be used in the modification may be selected from the group consisting of quaternary ammonium NH₄, or any alkyl or aryl quaternary ammonium, such as tetrabutylammonium, tetraoctylammonium, tetradodecylammonium, tetraoctadecylammonium, N,N-dimethyl dioctadecylammonium, N,N-dimethyl dioctyl ammonium, N,N-dimethyl dodecyl ammonium, N,N,N-trimethyl-1-docosanaminium, behenyl trimethylammonium, N-octadecyltrimethylammonium, and other quaternary ammonium compounds such as the quaternary ammonium compounds known as ARQUAD®s available from Akzo Nobel N.V., and mixtures thereof.

The quaternary ammonium compounds known as the ARQUAD®s are primarily alkyltrimethylammonium chlorides and may be represented by the formula R—N(CH₃)₃Cl wherein R is a long chain alkyl group having at least 8 carbon atoms. These particular quaternary ammonium compounds are marketed by Akzo Nobel N.V. under the trade-name ARQUAD®. Examples of suitable ARQUAD® materials are: Arquad® 316, cocoalkyltrimethylammonium from ARQUAD® C-35, didecydimethylammonium from ARQUAD® 2.10-50, ARQUAD® 2.10-70 HFP, 2.10-80, coco(fractionated) dimethylbenzylammonium from ARQUAD® MCB 33, ARQUAD® MCB 50, ARQUAD® MCB 80, hexadecyltrimethylammonium from ARQUAD® 16-29, stearyltrimethylammonium from ARQUAD® 18-50, behenyltrimethylammonium from ARQUAD® 20-80, or salts thereof. A variety of compounds of this class are available varying as to the length and number of long chain alkyl groups attached to the nitrogen atom. In other embodiments, the N-alkyl or N-aryl counterion is selected from one of the following:

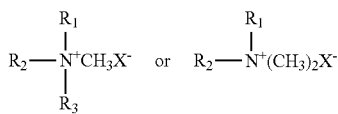

wherein $R_1$, $R_2$ and $R_3$ can be identical or different from one another and wherein each of $R_1$, $R_2$ and $R_3$ is independently selected from the group consisting of alkyl, alkoxy, aryl, and alkylaryl and wherein X is any halogen atom. In embodiments, the alkyl, alkoxy, aryl, and alkylaryl groups have equal to or greater than 4 carbon atoms. The quaternary ammonium counter ion can also include alkoxylates such as the following:

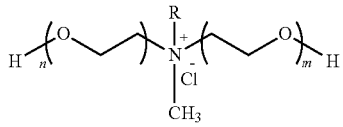

wherein R is H, $CH_3$, any alkyl linear or branched, or alkoxyl; and wherein m is an integer from 1 to 25 and wherein n is an integer from 1 to 25 and wherein, in embodiments m+n is from about 2 to about 25.

Examples include Ethoquad® C/12 wherein R is coco (a complex mixture of unsaturated and saturated C6 to C18 acids from coconut oil) and wherein m+n=2, Ethoquad® C/25 wherein R is coco and wherein m+n=15, Ethoquad® O/12 wherein R is oleyl and m+n=2, all available from Lion Akzo Corporation.

In embodiments, the quaternary ammonium counter ion herein can be an oligomer of the general formula

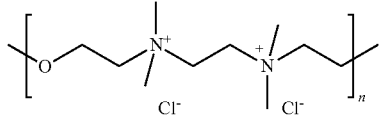

wherein n is an integer, in embodiments, wherein n is at least 1, in embodiments, wherein n is from about 1 to about 30. In a specific embodiment, the quaternary ammonium counter ion is poly[oxy-1,2-ethanediyl(dimethyliminio)-1,2-ethanediyl(dimethyliminio)-1,2-ethanediylchloride (1:2)]. A polixetonium chloride is commercially available from Advantis Technologies, Inc.

Examples of counter ions containing aryl groups include, but are not limited to, benzyltributylammonium bromide, benzyltributylammonium chloride, benzyltriethylammonium chloride, benzyltriethylammonium bromide, benzyltriethylammonium iodide, benzyltrimethylammonium iodide, benzyltrimethylammonium bromide, benzyltrimethylammonium chloride (neat or in solution)].

In certain embodiments, the naturally-derived colorant is modified with an aliphatic quaternary ammonium salt comprising an alkyl chain having at least eight carbon atoms, and, in embodiments, having more than 8 carbon atoms.

In other embodiments, the aliphatic quaternary ammonium salt, aromatic quaternary ammonium salt, or a mixture or combination thereof, is bio-based. Bio-based as used herein means that the aliphatic quaternary ammonium salt, an aromatic quaternary ammonium salt, or a mixture or combination thereof, is derived from natural sources. Bio-based materials are materials that are derived in whole or part from renewable biomass resources. Biomass resources are organic materials that are available on a renewable or recurring basis such as from crop residues, wood residues, grasses, and aquatic plants and as derived from bacteria and other microorganisms. Corn ethanol is a well-known example of a bio-based material derived from biomass resources. A bioproduct is a product that contains some amount of biobased material within it.

In other embodiments, the modified naturally-derived colorant is modified with an aliphatic quaternary ammonium salt, aromatic quaternary ammonium salt, or mixture or combination thereof, that contains an alkyl chain having at least 8 carbon atoms, and in embodiments having more than 8 carbon atoms, wherein the alkyl chain is biobased. Bio-based as used here means that the alkyl chain portion of the aliphatic quaternary ammonium salt, aromatic quaternary ammonium salt, or mixture or combination thereof is derived from natural sources.

Examples of bio-based quaternary ammonium salts include, but are not limited to, polyquaternium-4 (hydroxyethyl cellulose dimethyl diallylammonium chloride copolymer), polyquatemium-10 (quaternized hydroxyethyl cellulose), ARQUAD® PC 268-75 PG (ceteardimonium chloride and propylene Glycol), ARQUAD® PC C-33W (cocotrimonium chloride), ARQUAD® PC C-35 (cocotrimonium chloride), ARQUAD® PC 2C-75 (dicocodimonium chloride (and) isopropyl alcohol), ARQUAD® PC 16-29 (cetrimonium chloride), ARQUAD® PC 16-50 (cetrimonium chloride and isopropyl alcohol), ARQUAD® C-33W (cocoalkyl ammonium chloride), ARQUAD® C-50 (cocoalkyl ammonium chloride), ARQUAD® S-50 (soyaalkylammonium chloride), ARQUAD® T-27W (tallowalkylammonium chloride), ARQUAD® T-50 (tallowalkylammonium chloride), ARQUAD® 2C-70 nitrite dicocoalkyl-(b)-ammonium chloride), ARQUAD® 2C-70 PG (dicocoalkylammonium chloride), ARQUAD® 2C-75 (dicocoalkylammonium chloride), ARQUAD® 2HT-75 di(hydrogenated tallowalkyl)ammonium chloride), ARQUAD® 2HT-75 PG di(hydrogenated tallowalkyl)-(a)-ammonium chloride), ARQUAD® HTL8 MS 2-ethylhexyl hydrogenated tallowalkyl-(c)-ammonium chloride), ARQUAD® DMCB-80 (benzyldimethyl-cocoalkylammonium chloride), ARQUAD® DMHTB-75 (benzyldimethyl-(hydrogenated tallowalkyl)ammonium chloride), ARQUAD® M2HTB (benzylmethyl-di(hydrogenated tallowalkyl)ammonium chloride), ETHOQUAD® C/12B (benzylcocoalkyl[ethoxylated (2)]-ammonium chloride), ETHOQUAD® C/12-75 (cocoalkylmethyl[ethoxylated (2)]-ammonium chloride), ETHOQUAD® C/12 Nitrate (cocoalkylmethyl[ethoxylated (2)]-ammonium nitrate, ETHOQUAD® C/25 (cocoalkylmethyl[ethoxylated (15)]-ammonium chloride, ETHOQUAD® O/12 PG (oleylmethyl[ethoxylated (2)]-ammonium chloride, ETHOQUAD® T/13-27W (tris(2-hydroxyethyl)tallowalkylammonium acetates, ETHOQUAD® T/25 (tallowalkylmethyl)ethoxylated (15)]-ammonium chloride, DUOQUAD® T-50 (N,N,N',N',N'-pentamethyl-N-tallow-1,3-prop anediammonium dichloride and the like and mixtures thereof.

In specific embodiments, the modifying component is a quaternary ammonium salt such as N,N-dimethyldioctadecyl ammoniumbromide.

In specific embodiments, the quaternary ammonium counter ion herein can be esterquats of the formulae

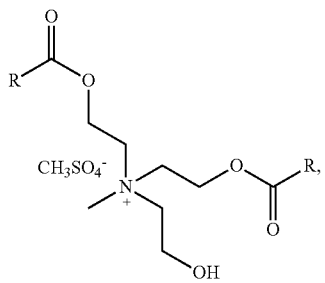

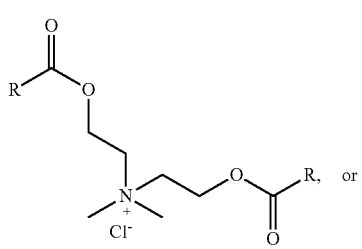

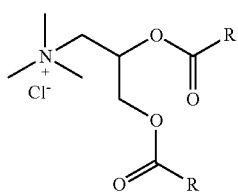

wherein R is n-heptyl, n-nonyl, n-undecyl, n-tridecyl, n-pentadecyl, n-heptadecyl, n-nonadecyl, n-heneicosyl and mixtures thereof.

Examples of esterquats include, but are not limited to, esterquats such as those available from Kao Chemicals Inc., quaternary ammonium salts of: reacted fatty acids, C10-C20 and unsaturated C16-C18, with triethanolamine (CAS No. 91995-81-2), reacted tallow fatty acids with triethanolamine (CAS No. 93334-15-7), reacted fatty acids, C12-C20 with triethanolamine (CAS No. 91032-11-0), reacted 9-octadecenoic acid (Z) with triethanolamine (CAS No. 94095-35-9), reacted octadecenoic acid with triethanolamine (CAS No. 85408-12-4). Other examples of esterquats include dimethylbis[2[(1-oxooctadecyl)oxyl]ethyl]ammonium chloride (CAS No. 67846-68-8), Dimethylbis[2-[(1-oxohexadecyl)oxy]ethyl]ammonium chloride (97158-31-1) and (Z)-2-hydroxy-3-[(1-oxo-9-octadecenyl)oxy]propyltrimethylammonium chloride (CAS No. 19467-38-0).

In other embodiments, quaternary ammonium compounds comprising alkyltrimethylammonium chlorides represented by the formula R—N(CH$_3$)$_3$Cl wherein R is a long chain alkyl group having at least 8 carbon atoms can be selected as the modifying component. A variety of compounds of this class are available varying as to the length and number of long chain alkyl groups attached to the nitrogen atom. Certain quaternary ammonium compounds are marketed by Akzo Nobel N.V. under the trade-name ARQUAD® such as Arquad® 316.

In specific embodiments, the modified naturally-derived colorant is of the formula

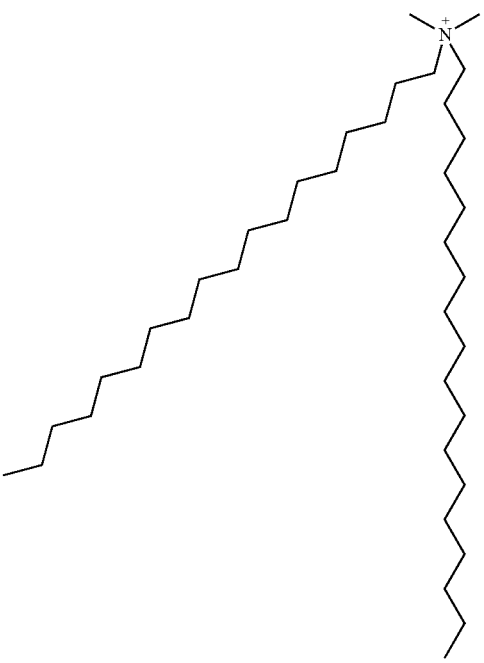

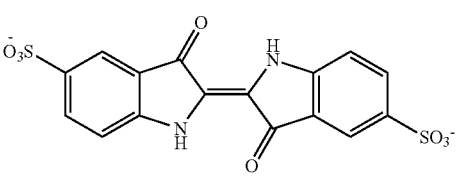

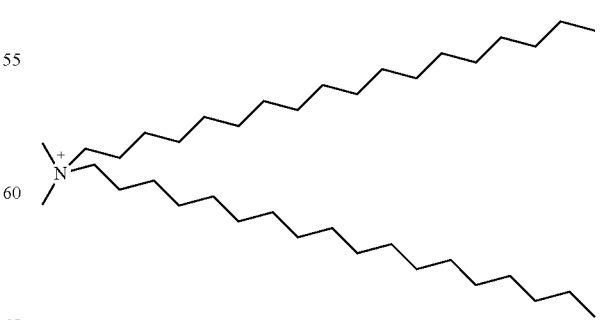

In further specific embodiments, the modified naturally-derived colorant is of the formula

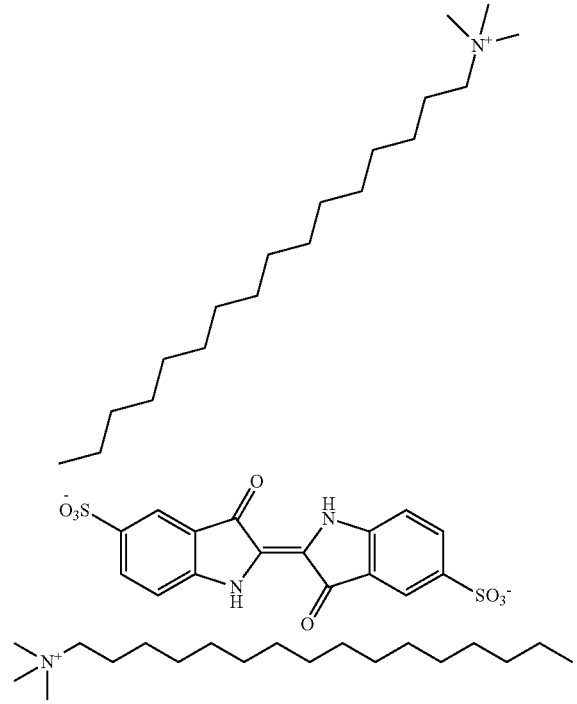

In further specific embodiments, the modified naturally-derived colorant is of the formula

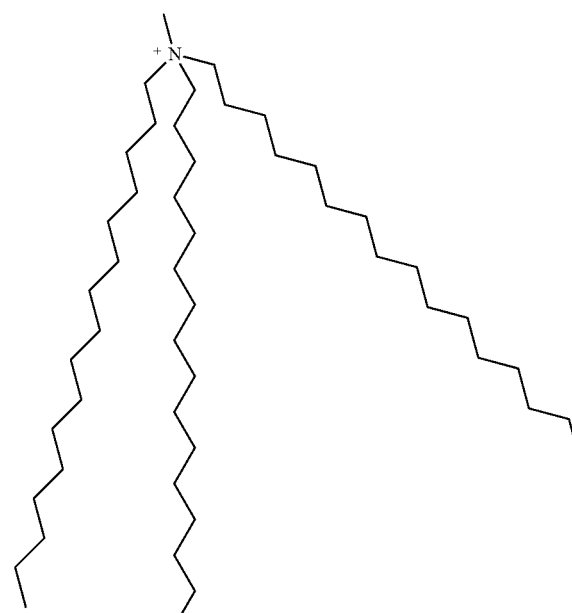

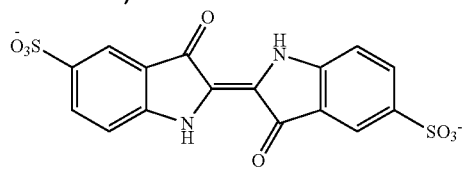

-continued

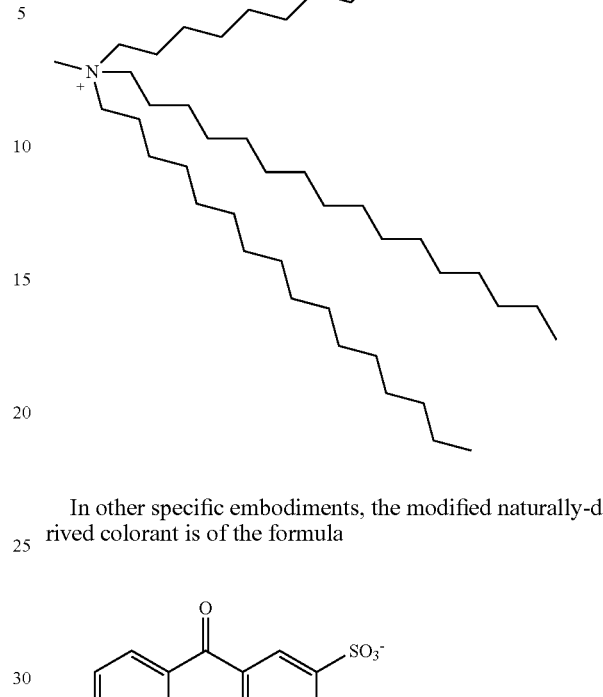

In other specific embodiments, the modified naturally-derived colorant is of the formula

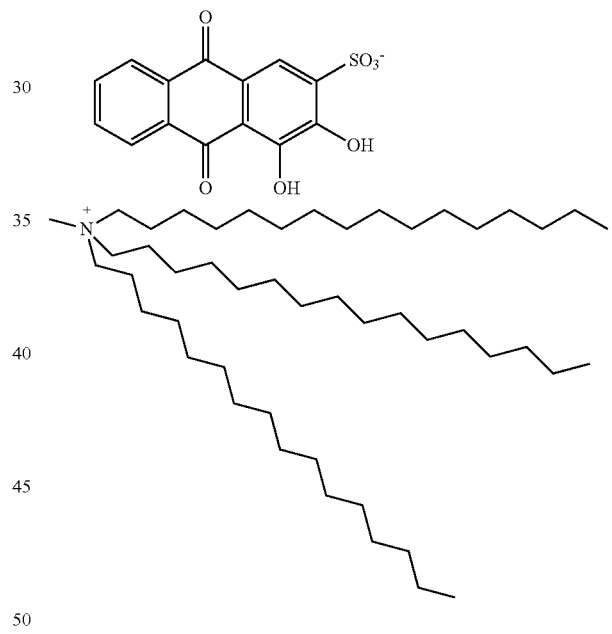

The modified naturally-derived colorants herein can be prepared by any suitable or desired process. In embodiments, a process for preparing a modified naturally-derived colorant in accordance with the present disclosure comprises providing a natural or naturally-derived colorant; contacting the naturally-derived colorant with a modifying component selected from the group consisting of an aliphatic quaternary ammonium salt, an aromatic quaternary ammonium salt, or a mixture or combination thereof; to provide a modified naturally-derived colorant that is compatible with phase change ink vehicles. In embodiments, the naturally-derived colorant contains a sodium counter ion and the modifying component displaces the sodium counter ion.

Contacting the naturally-derived colorant with a modifying component can comprise contacting in water with heating, and, optionally, isolating the modified naturally-derived colorant.

Any suitable or desired amount of naturally-derived colorant and modifying component can be used. In embodiments, the naturally-derived colorant and modifying component are provided in a 1:1 ratio wherein the naturally derived colorant contains one sulfonate group such as a modified alizarin pigment including Alizarin Red S.

In other embodiments, the naturally-derived colorant and modifying component are provided in a 1:2 ratio wherein the naturally derived colorant is a modified indigo pigment containing two sulfonate groups such as a modified indigo pigment including C.I. Acid Blue 74.

In still other embodiments, the naturally-derived colorant and modifying component are provided in a 1:3 ratio wherein the naturally derived colorant is a modified indigo pigment containing three sulfonate groups such as 2-(1,3-dihydro-3-oxo-5-sulfo-2H-indol-2-ylidene)-2,3-dihydro-3-oxo-, tripotassium salt (CAS No. 67627-18-3) represented by the structure

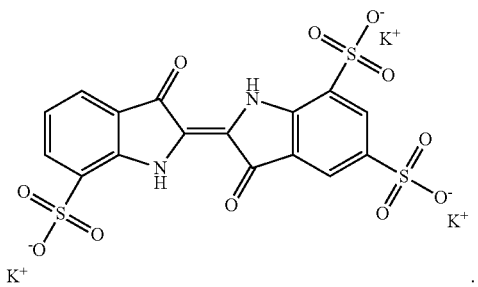

In yet other embodiments, the naturally-derived colorant and modifying component are provided in a 1:4 ratio wherein the naturally derived colorant is a modified indigo pigment containing four sulfonate groups such as a modified indigo pigment including the structure

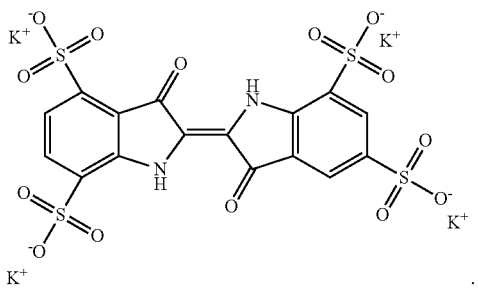

Any suitable or desired amount of water can be used. In embodiments, the naturally-derived colorant and a modifying component are contacted in about 100 to about 1,000 milliliters of water. The amount of water can be selected by one of skill in the art determined by the reaction scale. For larger scales, more water is necessary. Typically, 1 gram of colorant to approximately 34 grams of water is selected. Before modification, the colorant is soluble in water; once the modification is completed, the compound becomes insoluble in water and can be easily isolated.

The naturally-derived colorant with a modifying component can be heated to any suitable or desired temperature. In embodiments, heating can be to from about 40° C. to about 100° C., or from about 50° C. to about 90° C., or from about 60° C. to about 80° C., for a period of from about 1 to about 6 hours, or from about 2 to about 5 hours, or from about 3 to about 4 hours. Any removal of water from the original amount used, such as by evaporation due to heating, can be reinstated with a suitable addition of more water.

The final modified naturally-derived colorant product can be isolated, such as by filtration, and optionally washed, such as with water, to remove inorganic salts.

In some embodiments, such as Indigo Carmine, the pigment character has been preserved in the modified compound such that the modified compound is insoluble in solvents and water. In such embodiments, a dispersant can be employed for solid ink stabilization.

The present modification has been very beneficial for particle size reduction. In embodiments, the particle size of the final product has been reduced from an original particle size of typically about 1 micrometer to about 200 nanometers volume average particle diameter as determined by Transmission Electron Microscopy. FIG. 1 shows a micrograph of the non-modified Indigo Carmine FIG. 2 shows a micrograph of an Indigo Carmine of the present disclosure as modified with N,N-dimethyldioctadecylammonium bromide.

In embodiments, the modified-naturally-derived colorants herein are self-dispersible in phase change ink vehicles. In specific embodiments, modified Alizarin Red S gained a "dye-like" character including the ability to self-disperse in solid ink.

The modified-naturally-derived colorant can be present in the phase change ink compositions in any desired or effective amount to obtain the desired color or hue, in embodiments from about 0.1 to about 50 percent, or from about 0.1 percent to about 20 percent by weight based on the total weight of the phase change ink composition.

The phase change ink compositions can include additional colorant selected from the group consisting of traditional dyes, pigments, and mixtures and combinations thereof; and optionally, an additional colorant that is a second, different modified naturally-derived colorant. If more than one colorant is included, the total amount of colorant present in the phase change ink composition can be any desired or effective amount to obtain the desired color or hue, in embodiments from about 0.1 to about 50 percent, or from about 0.1 percent to about 20 percent total colorant by weight based on the total weight of the phase change ink composition.

Any desired or effective colorant can be employed as the optional additional colorant in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon® Red 492 (BASF); Orasol® Red G (Pylam Products); Direct Brilliant Pink B (Oriental Giant Dyes); Direct Red 3BL (Classic Dyestuffs); Supranol® Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol® Brilliant Yellow 4GF (Clariant); Cibanone Yellow 2G (Classic Dyestuffs); Orasol® Black RLI (BASF); Orasol® Black CN (Pylam Products); Savinyl Black RLSN(Clariant); Pyrazol Black BG (Clariant); Morfast® Black 101 (Rohm & Haas); Diaazol Black RN (ICI); Thermoplast® Blue 670 (BASF); Orasol® Blue GN (Pylam Products); Savinyl Blue GLS (Clariant); Luxol Fast Blue MBSN (Pylam Products); Sevron Blue 5GMF (Classic Dyestuffs); Basacid® Blue 750 (BASF); Keyplast Blue (Keystone Aniline Corporation);

Neozapon® Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen® Blue FF-4012 (BASF); Fastol® Black BR (C.I. Solvent Black 35) (Chemische Fabriek Triade BV); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. Nos. 5,621,022 and 5,231,135, the disclosures of each of which are hereby incorporated by reference herein in their entireties, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint® Orange X-38, uncut Reactint® Blue X-17, Solvent Yellow 162, Acid Red 52, Solvent Blue 44, and uncut Reactint® Violet X-80.

Pigments are also suitable optional additional colorants for the phase change ink. Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); Hostaperm® Blue B4G (Clariant); SPECTRA® PAC C Blue 15:4 (Sun Chemical); Permanent Red P-F7RK; Hostaperm® Violet BL (Clariant); LITHOL® Scarlet 4440 (BASF); Bon Red C (Dominion Color Company); ORACET® Pink RF (BASF); PALIOGEN® Red 3871K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF); PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL® Fast Yellow 0991K (BASF); PALIOTOL® Yellow 1840 (BASF); NOVOPERM® Yellow FGL (Clariant); Ink Jet Yellow 4G VP2532 (Clariant); Toner Yellow HG (Clariant); Lumogen® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, 6,821,327, 7,053,227, 7,381,831 and 7,427,323, the disclosures of each of which are hereby totally incorporated by reference herein in their entireties.

The phase change ink compositions herein further include an ink vehicle. The phase change ink compositions can include any suitable ink vehicle such as paraffins, microcrystalline waxes, polyethylene waxes, ester waxes, amides, fatty acids and other waxy materials, fatty amide containing materials, sulfonamide materials, resinous materials made from different natural sources (tall oil rosins and rosin esters, for example), and many synthetic resins, oligomers, polymers, and copolymers such as further discussed below.

In embodiments, the phase change ink compositions herein include a polyalkylene wax. In specific embodiments, the wax is a polymethylene wax, a polyethylene wax, or a mixture of combination thereof.

In certain embodiments, the phase change ink compositions herein include a biodegradable wax. In embodiments, the biodegradable wax is a biodegradable polyethylene wax. For example, the wax can be a biodegradable polyethylene wax sold under the name Accumelt® 78, from IGI Waxes.

In embodiments, the phase change ink compositions herein further comprise a low melting wax. In embodiments, the low melting wax is a polyalkylene wax, a functional wax, or a combination thereof. The term "functional wax" is known to one of skill in the art and can mean herein any suitable functional wax, in embodiments, including, but not limited to, a wax with polar groups, for example, alcohols, amides, esters, urethanes, etc. As used herein, the term "low melting wax" includes any suitable low melting wax, including, in embodiments, a wax having a melting point of less than about 120° C.

Examples of suitable amides include, for example, diamides, triamides, tetra-amides, cyclic amides and the like. Suitable triamides include, for example, those disclosed in U.S. Pat. No. 6,860,930, the entire disclosure of which is incorporated herein by reference. Suitable other amides, such as fatty amides including monoamides, tetra-amides, and mixtures thereof, are disclosed in, for example, U.S. Pat. Nos. 4,889,560, 4,889,761, 5,194,638, 4,830,671, 6,174,937, 5,372,852, 5,597,856, and 6,174,937, and British Patent No. GB 2 238 792, the entire disclosures of each are incorporated herein by reference.

The wax can be present in the phase change ink composition in any suitable or desired amount. In embodiments, the wax is present in the phase change ink composition in an amount of from about 25 percent to about 65 percent by weight based on the total weight of the dye-based phase change ink composition. In embodiments, the wax is a low melting wax present in the phase change ink composition in an amount of from about 25% to less than about 65% by weight based on the total weight of the ink carrier.

Other suitable carrier materials that can be used in the phase change ink composition include isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, and 6,309,453, British Patents Nos. GB 2 294 939, GB 2 305 928, GB 2 305 670, and GB 2 290 793, and PCT Publications WO 94/14902, WO 97/12003, WO 97/13816, WO 96/14364, WO 97/33943, and WO 95/04760, the entire disclosures of each of which are incorporated herein by reference.

Further examples of suitable ink vehicles include ethylene/propylene copolymers, such as those available from Baker Petrolite. Commercial examples of such copolymers include, for example, Petrolite CP-7 (Mn=650), Petrolite CP-11 (Mn=1,100, Petrolite CP-12 (Mn=1,200) and the like. The copolymers may have, for example, a melting point of from about 70° C. to about 150° C., such as from about 80° C. to about 130° C. or from about 90° C. to about 120° C. and a molecular weight range (Mn) of from about 500 to about 4,000.

Another type of ink vehicle may be n-paraffinic, branched paraffinic, and/or naphthenic hydrocarbons, typically with from about 5 to about 100, such as from about 20 to about 80 or from about 30 to about 60 carbon atoms, generally prepared by the refinement of naturally occurring hydrocarbons, such as BE SQUARE® 185 and BE SQUARE® 195, with molecular weights (Mn) of from about 100 to about 5,000, such as from about 250 to about 1,000 or from about 500 to about 800, for example such as available from Baker Petrolite.

Highly branched hydrocarbons, typically prepared by olefin polymerization, such as the VYBAR® materials available from Baker Petrolite, including VYBAR® 253 (Mn=520), VYBAR® 5013 (Mn=420), and the like, may also be used. In addition, the ink vehicle may be an ethoxylated alcohol, such as available from Baker Petrolite and of the general formula

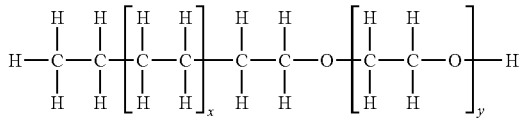

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX® 420 (Mn=560), UNITHOX® 450 (Mn=900), UNITHOX® 480 (Mn=2,250), UNITHOX® 520 (Mn=700), UNITHOX® 550 (Mn=1,100), UNITHOX® 720 (Mn=875), UNITHOX 750 (Mn=1,400), and the like.

As an additional example, the ink vehicle may be made of fatty amides, such as monoamides, tetra-amides, mixtures thereof, and the like, for example such as described in U.S. Pat. No. 6,858,070, which is hereby incorporated herein by reference. Suitable monoamides may have a melting point of at least about 50° C., for example from about 50° C. to about 150° C., although the melting point can be outside these ranges. Specific examples of suitable monoamides include, for example, primary monoamides and secondary monoamides. stearamide, such as KEMAMIDE® S available from Witco Chemical Company and CRODAMIDE® S available from Croda, behenamide/arachidamide, such as KEMAMIDE® B available from Witco and CRODAMIDE® BR available from Croda, oleamide, such as KEMAMIDE® U available from Witco and CRODAMIDE® OR available from Croda, technical grade oleamide, such as KEMAMIDE® O available from Witco, CRODAMIDE® O available from Croda, and UNISLIP® 1753 available from Uniqema, and erucamide such as KEMAMIDE® E available from Witco and CRODAMIDE® ER available from Croda, are some examples of suitable primary amides. Behenyl behenamide, such as KEMAMIDE® EX666 available from Witco, stearyl stearamide, such as KEMAMIDE® S-180 and KEMAMIDE® EX-672 available from Witco, stearyl erucamide, such as KEMAMIDE® E-180 available from Witco and CRODAMIDE® 212 available from Croda, erucyl erucamide, such as KEMAMIDE® E-221 available from Witco, oleyl palmitamide, such as KEMAMIDE® P-181 available from Witco and CRODAMIDE® 203 available from Croda, and erucyl stearamide, such as KEMAMIDE® S-221 available from Witco, are some examples of suitable secondary amides. Additional suitable amide materials include KEMAMIDE® W40 (N,N'-ethylenebisstearamide), KEMAMIDE® P181 (oleyl palmitamide), KEMAMIDE® W45 (N,N'-thylenebisstearamide), and KEMAMIDE® W20 (N,N'-ethylenebisoleamide). In embodiments, the phase change ink composition includes (a) stearyl stearamide, (b) a dimer acid based tetra-amide that is the reaction product of dimer acid, ethylene diamine, and stearic acid, or (c) mixtures thereof. The phase change ink composition can include a mixture of one or more amides and one or more isocyanate-derived materials.

High molecular weight linear alcohols, such as those available from Baker Petrolite and of the general formula

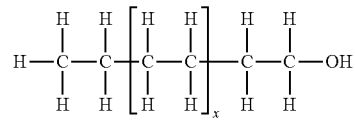

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN® materials such as UNILIN® 425 (Mn=460), UNILIN® 550 (Mn=550), UNILIN® 700 (Mn=700), and distilled alcohols, the viscosity of which at the jetting temperature in one embodiment can be from about 5 to about 50% higher than the non-distilled alcohol.

A still further example includes hydrocarbon-based waxes, such as the homopolymers of polyethylene available from Baker Petrolite and of the general formula

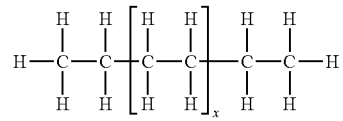

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include PW400 (Mn about 400), distilled PW400, in one embodiment having a viscosity of about 10% to about 100% higher than the viscosity of the undistilled POLYWAX® 400 at about 110° C., POLYWAX 500 (Mn about 500), distilled POLYWAX® 500, in one embodiment having a viscosity of about 10% to about 100% higher than the viscosity of the undistilled POLYWAX® 500 at about 11° C., POLYWAX 655 (Mn about 655), distilled POLYWAX® 655, in one embodiment having a viscosity of about 10% to about 50% lower than the viscosity of the undistilled POLYWAX® 655 at about 110° C., and in yet another embodiment having a viscosity of about 10% to about 50% higher than the viscosity of the undistilled POLYWAX® 655 at about 110° C. POLYWAX 850 (Mn about 850), POLYWAX 1000 (Mn about 1,000), and the like.

Another example includes modified maleic anhydride hydrocarbon adducts of polyolefins prepared by graft copolymerization, such as those available from Baker Petrolite and of the general formulas

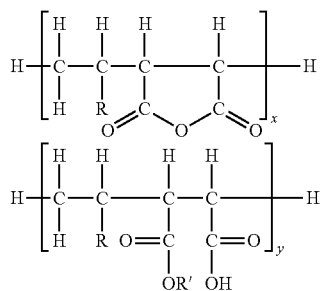

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; and those available from Baker Petrolite and of the general formula

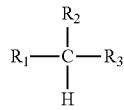

wherein $R_1$ and $R_3$ are hydrocarbon groups and $R_2$ is either of one of the general formulas

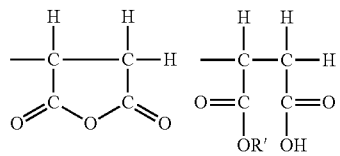

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER® 67 (Mn=655, Mw/Mn=1.1), CERAMER® 1608 (Mn=700, Mw/Mn=1.7), and the like.

Additional examples of suitable ink vehicles for the phase change inks include rosin esters; polyamides; dimer acid amides; fatty acid amides, including ARAMID® C; epoxy resins, such as EPOTUF® 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX® MH and KETJENFLEX® MS80; benzoate esters, such as BENZOFLEX® 5552, available from Velsicol Chemical Company; phthalate plasticizers; citrate plasticizers; maleate plasticizers; sulfones, such as diphenyl sulfone, n-decyl sulfone, n-amyl sulfone, chlorophenyl methyl sulfone; polyvinyl pyrrolidinone copolymers; polyvinyl pyrrolidone/polyvinyl acetate copolymers; novolac resins, such as DUREZ® 12 686, available from Occidental Chemical Company; and natural product waxes, such as beeswax, monton wax, candelilla wax, GILSONITE® (American Gilsonite Company), and the like; mixtures of linear primary alcohols with linear long chain amides or fatty acid amides, such as those with from about 6 to about 24 carbon atoms, including PARICIN® 9 (propylene glycol monohydroxystearate), PARICIN® 13 (glycerol monohydroxystearate), PARICIN® 15 (ethylene glycol monohydroxystearate), PARICIN® 220 (N(2-hydroxyethyl)-12-hydroxystearamide), PARICIN® 285 (N,N'-ethylene-bis-12-hydroxystearamide), FLEXRICIN® 185 (N,N'-ethylene-bis-ricinoleamide), and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials.

In addition, the ink vehicles described in U.S. Pat. No. 6,906,118, which is incorporated herein by reference, may also be used. The ink vehicle may contain a branched triamide such as those described in U.S. Pat. No. 6,860,930, the disclosure of which is also incorporated by reference herein,

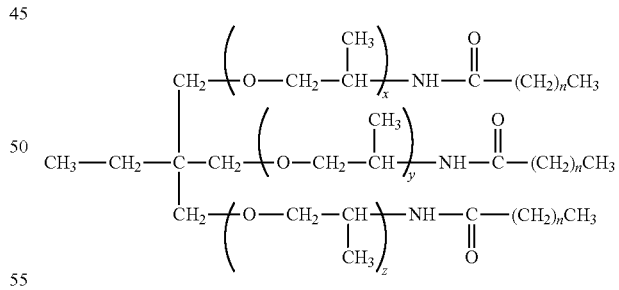

wherein n has an average value of from about 34 equal to or less than 40, where x, y and z can each be zero or an integer, and wherein the sum of x, y, and z is from about 5 and equal to or less than 6.

The phase change ink composition can optionally contain a dispersant. Any suitable or desired dispersant can be employed. In embodiments, the dispersant can be a dispersant described in U.S. Pat. No. 7,973,186 of Adela Goredema, et al., which is hereby incorporated by reference herein in its entirety. In embodiments, the dispersant is a compound of the formula

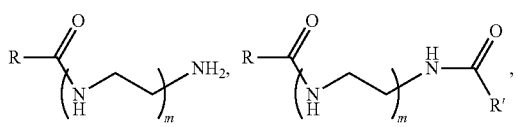

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30. The dispersant can optionally be a polymeric dispersant such as those sold under the name Solsperse®, in embodiments, Solsperse® 1700, available from The Lubrizol Corporation.

In embodiments, the dispersant can be selected to steer the color of the phase change ink.

Optionally, a plasticizer, which can be either a solid or liquid plasticizer, such as benzyl phthalates, triaryl phosphate esters, pentaerythritol tetrabenzoate, dialkyl adipate, dialkyl phthalates, dialkyl sebacate, alkyl benzyl phthalates, ethylene glycol monostearate, glycerol monostearate, propylene glycol monostearate, dicyclohexyl phthalate, diphenyl isophthalate, triphenyl phosphate, dimethyl isophthalate, and mixtures thereof, or the like can also be included in the ink carrier. The plasticizer is present in the ink carrier in any desired or effective amount, such as from about 0.05% by weight of the ink carrier. Examples of suitable plasticizers include SANTICIZER® 278, SANTICIZER® 154, SANTICIZER®160, SANTICIZER® 261 (commercially available from Monsanto), and the like or mixtures thereof.

A hindered amine antioxidant can optionally be present in the ink in any desired or effective amount, such as from about 0.001 percent to about 0.50 percent by weight of the total ink composition.

Examples of suitable hindered amine antioxidants include those of general formula

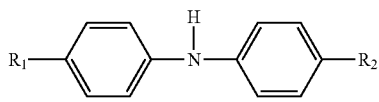

wherein $R_1$ and $R_2$ each, independently of the other, can be a hydrogen atom or an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom, if substituted, substitutions can be alkyl or phenyl.

Specific examples of suitable hindered amine antioxidants include the following antioxidants commercially available from Crompton; NAUGUARD® 445 where $R_1=R_2=C(CH_3)_2Ph$, NAUGUARD® 635 where $R_1=R_2=-CH(CH_3)Ph$, NAUGUARD® PS-30 where $R_1=C_4$ or $C_8$, $R_2=C_4$ or $C_8$ and the like.

A hindered phenol antioxidant can also be provided. In one embodiment the hindered phenol is present in a relatively high concentration. A high concentration of hindered phenol antioxidant maximizes long term thermal stability by delaying the onset of the oxidation itself. The hindered phenol antioxidant is present in the ink in any desired or effective amount, in embodiments from about 0.01% to about 4.0% by weight of the total ink composition. Specific examples of suitable hindered phenol antioxidants include ETHANOX® 330, ETHANOX® 310, ETHANOX® 314, ETHANOX® 376 (commercially available from Albemarle) and the like. Also commercially available from Ciba Specialty Chemicals are IRGANOX® 1010, IRGANOX® 1035, IRGANOX®1076, IRGANOX® 1330 and the like. Mixtures of two or more of these hindered phenol antioxidants can also be employed.

A rosin ester resin, mixtures thereof, or the like can also be included in the dye-based phase change ink composition. The rosin ester resin is present in any desired or effective amount, in embodiments from 0.5% to about 20% by weight of the total ink composition. Examples of suitable rosin ester resins include PINECRYSTAL® KE-100 (commercially available from Arakawa), and the like.

The phase change ink composition can include ink carrier comprising wax and other optional carrier components in any desired or effective amount, in one embodiment in an amount of at least about 50% to about 99 by total weight of the phase change ink composition, although the amount can be outside of this range. In certain embodiments, the ink carrier can be present in an amount of from about 25% to about 65% by total weight of the phase change ink composition.

In one specific embodiment, the ink carrier has a melting point of less than about 110° C., and in another embodiment of less than about 100° C., although the melting point of the ink carrier can be outside of these ranges. The phase change ink compositions disclosed herein in one embodiment have melting points in one embodiment equal to or less than about 130° C., in another embodiment equal to or less than about 120° C., in a further embodiment equal to or less than about 110° C., and in still another embodiment equal to or less than about 100° C., although the melting point can be outside of these ranges.

The phase change ink compositions prepared by the process disclosed herein generally have melt viscosities, at the jetting temperature which can be equal to or less than about 145° C., in one embodiment equal to or less than about 130° C., and in another embodiment equal to or less than about 120° C., in a further embodiment equal to or less than about 110° C., and in yet another embodiment equal to or less than about 80° C., although the jetting temperature can be outside of these ranges, which are in one embodiment equal to or less than about 30 centipoise (cps), in another embodiment equal to or less than about 25 cps, and in yet a further embodiment equal to or less than about 20 cps, and in another embodiment no less than about 2 cps, in a further embodiment no less than about 3 cps, and in yet a further embodiment no less than about 4 cps, although the melt viscosity can be outside of these ranges.

In certain embodiments, the phase change ink composition herein has a jetting temperature of from about 100° C. to about 130° C.

In embodiments, the phase change ink composition herein has a viscosity of about 9 to about 12 centipoise at 110° C. In certain embodiments, the phase change ink composition herein has a viscosity of about 10 centipoise at 110° C.

The phase ink compositions of the present disclosure can be prepared by any desired or suitable method. In embodiments, a method for preparing a phase change ink composition comprises combining a wax; an optional dispersant, and a modified naturally-derived colorant comprising a naturally-derived colorant that is modified with an aliphatic quaternary ammonium salt, an aromatic quaternary ammonium salt, or a mixture or combination thereof to produce a phase change ink composition. For example, the ink ingredients can be mixed together, followed by heating, to a temperature of at least about 100° C. to no more than about 140° C., although the temperature can be outside of this range, and stiffing until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

In addition to being a more sustainable solid ink composition as compared to previous compositions, in embodiments, the phase change ink compositions herein have a distinguishing property when compared with regular pigmented inks: prints made with the present phase change ink compositions can have a metallic-like appearance, easily detectable with naked eye. The metallic appearance is an exciting property with many uses. In embodiments, the phase change ink compositions herein provide a metallic-like appearance that can function as a security feature.

In certain embodiments, the phase change ink compositions herein further comprise an additional component to enhance the security feature of the ink. In embodiments, the phase change ink compositions herein include an additional component which renders the ink more secure and unique as compared to other solid ink security inks available to date. The phase change ink compositions herein can be used in various printing and packaging applications. The phase change ink compositions herein can be used as security inks which enable novel uses of said inks including, but not limited to, use in the transactional and promotional sector and in packaging. Digitally printed customized discount checks and coupons are key components of transactional and promotional documents. Given that worldwide losses due to counterfeiting are believed to have hit the record value of over $600 billion every year, and further that it is believed that one third of all promotional coupons in the U.S. are believed to be counterfeited, the need for protection is unquestionable. The security printing market in the packaging industry alone is estimated to reach $85 Billion by 2015 with a compound annual growth rate of 8% (2010-2015).

In embodiments, a novel solid ink composition for security printing applications is provided. The phase change ink composition comprises a solid ink base, a pigment which provides a metallic-like appearance when printed, and a fluorescent dye. The performance of the phase change ink composition is unique because it has dual security features: a metallic appearance under normal viewing conditions and a colored appearance when viewed with ultraviolet (UV) light sources such as black light typically found in stores for authenticating currency bills. The phase change ink provides a uniqueness which is a key requirement which renders an ink more difficult to counterfeit. The present inventors have demonstrated inks emitting various colors, i.e. red, green and blue under UV light. Printability of these unique ink compositions was also demonstrated.

While traditional metallic pigments are large in size and very difficult to disperse in solid ink, the present modified naturally-derived colorant, in embodiments, modified indigo, disperses easily and has a metallic appearance when printed.

In certain embodiments, a phase change ink composition herein comprises a solid ink base material; a pigment package providing metallic-like appearance when printed; and a fluorescent dye additive. In embodiments, the phase change ink has unique properties never reported before including a metallic-like appearance when viewed under normal viewing conditions and the ability to emit bright colored light when activated with UV light. The phase change inks can be used for various applications as noted hereinabove including for applications such as transactional and promotional applications and secure packaging printing.

In embodiments, a phase change ink composition herein comprises an ink vehicle, in embodiments the ink vehicle comprising a wax; an optional dispersant; an optional synergist, a modified naturally-derived colorant comprising a naturally-derived colorant that is modified with an aliphatic quaternary salt, an olephenic quaternary salt, an aromatic quaternary salt, or a mixture or combination thereof; and a fluorescent dye.

The phase change ink composition including fluorescent dye can contain any of the ink base or carrier materials described herein.

In embodiments, the phase change ink composition including fluorescent dye further contains a dispersant and optionally contains synergist. The dispersant can be any suitable or desired dispersant. In embodiments, the dispersant and can be selected from dispersants as described herein. The synergist can be a can be any suitable or desired synergist. In embodiments, the synergist and can be selected from synergists as described herein.

In embodiments, a phase change ink composition herein comprises an ink vehicle; an optional dispersant; an optional synergist, a modified naturally-derived colorant, and a fluorescent dye.

In specific embodiments, the modified naturally-derived colorant is of the formula

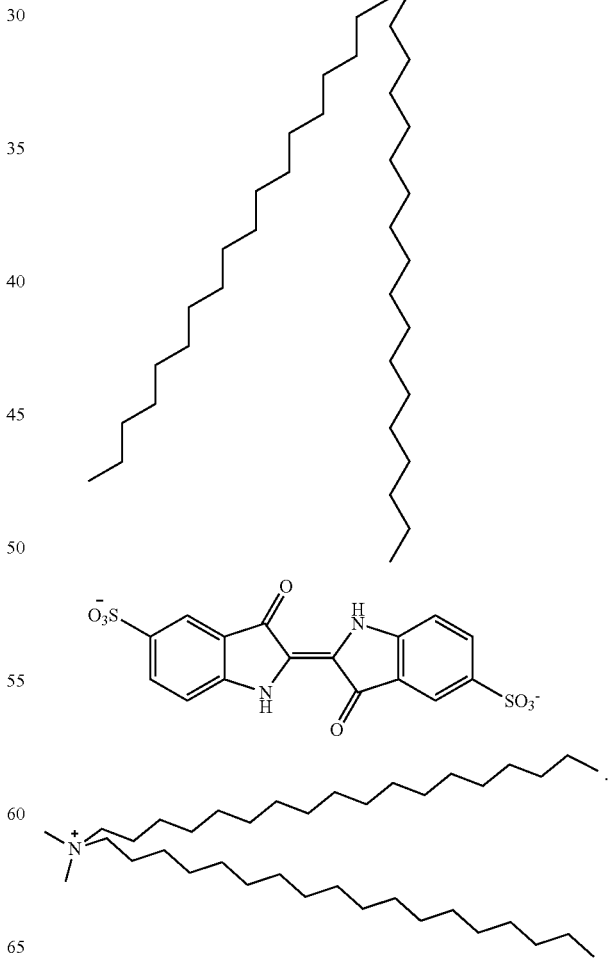

In further specific embodiments, the modified naturally-derived colorant is of the formula

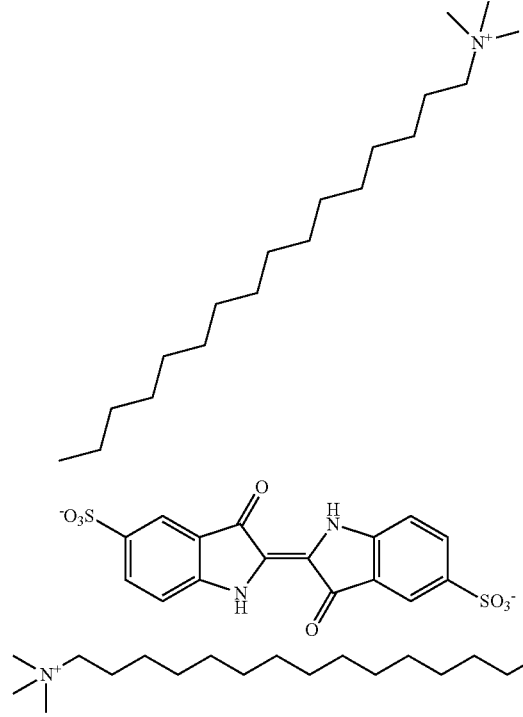

In further specific embodiments, the modified naturally-derived colorant is of the formula

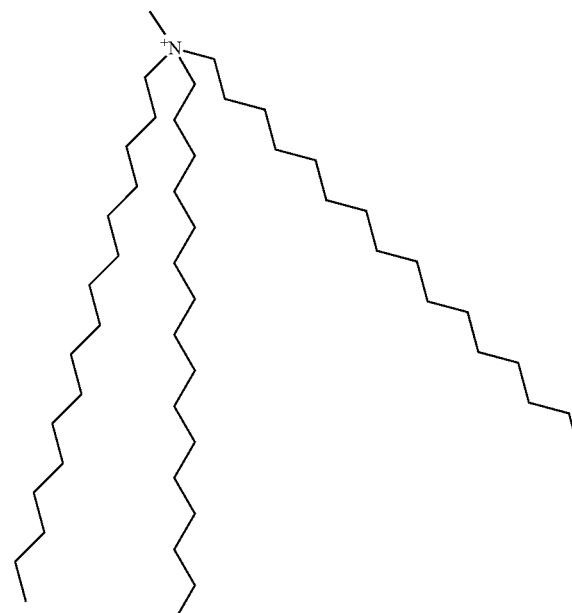

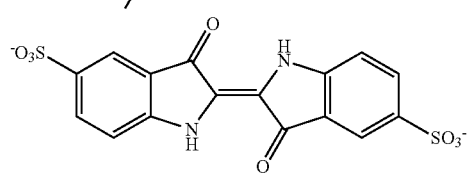

-continued

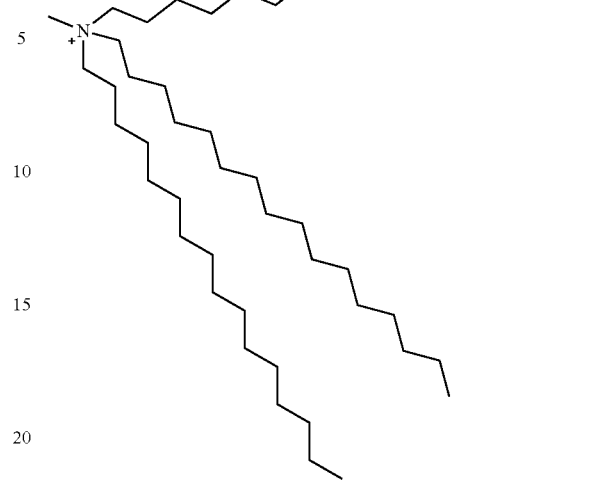

In other specific embodiments, the modified naturally-derived colorant is of the formula

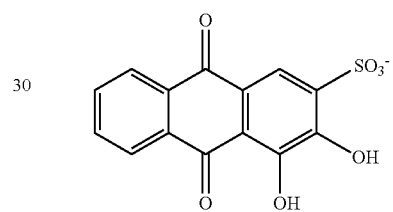

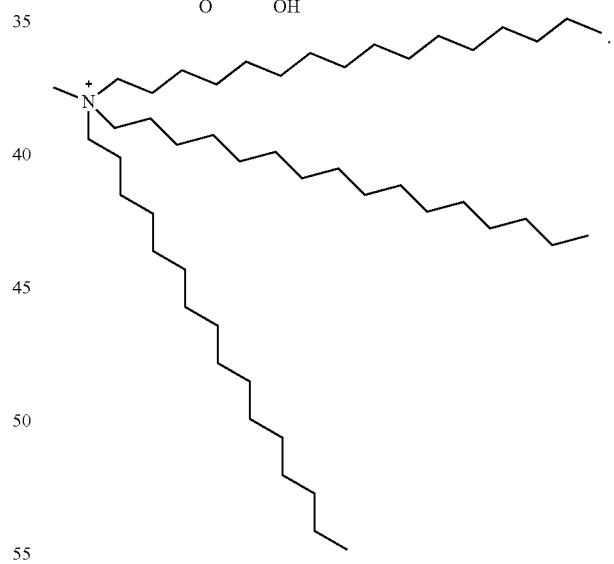

The fluorescent dye can be any suitable or desired fluorescent dye. The fluorescent dye is typically a dye which is colorless in normal viewing light, for example in room ambient light or sunlight, and which emits bright light when viewed with ultra-violet (UV) light, although not limited. Examples of fluorescent dyes suitable for use herein include those belonging to the dye families known as rhodamines, fluorescein, coumarins, napthalimides, benzoxanthenes, acridines, azos, coordination complexes of rare earth metal ions, mixtures thereof and the like. Various invisible fluorescent dyes are commercially available. Other suitable fluorescent dyes include oil and solvent based dyes like DFSB class, DFPD class, DFSB-K class available from Risk Reactor of Huntington Beach, Calif. Other suppliers of fluorescent materials include Beaver Luminescers from Newton, Mass., and Cleveland Pigment &Color Co. form Akron, Ohio.

Suitable fluorescent dyes include, both colorless and colored dyes under normal viewing conditions and include for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, solvent Yellow 43, Solvent Yellow 160, Fluorescent Brightener 61, mixtures thereof and the like. Other suitable fluorescent dyes include oil and solvent based dyes like DFSB class, DFPD class, DFSB-K class available from Risk reactor of Huntington Beach, Calif. Suitable fluorescent pigments include, but are not limited to, those available from Day-Glo Color Corp. of Cleveland, Ohio, such as aurora pink T-11 and GT-11, neon red T-12, rocket red T-13 or GT-13, fire orange T-14 or GT-14N, blaze orange T-15 or GT-15N, arc yellow T-16, saturn yellow T-17N, corona magenta GT-21 and GT-17N, mixtures thereof and the like. Other suitable fluorescent pigments available from Risk Reactor are for example PFC class, like for example PFC-03 which switches from invisible to red when exposed to UV light, PF class like for example PF-09 which switches from invisible to violet when exposed to UV light. Other suppliers of fluorescent materials include Beaver Luminescers from Newton, Mass. and Cleveland Pigment & Color Co. form Akron, Ohio. Non-limiting examples of fluorescent materials include 2-(2-hydroxybenzoxazol), 2,5-diphenyl-oxazole, DFKY-C7 (red emitting fluorescent rare earth metal coordination complex dye), DFSB K427 (emits orange color under ambient light and under exposure to UV light), 2-(2-hydroxyphenylbenzothoazole), and mixtures thereof.

In embodiments, the present phase change ink comprising an ink vehicle; an optional dispersant; an optional synergist, a modified naturally-derived colorant comprising a naturally-derived colorant that is modified with an aliphatic quaternary salt, an olephenic quaternary salt, an aromatic quaternary salt, or a mixture or combination thereof; and a fluorescent dye possesses a dual metallic-like appearance (visible) and fluorescent (UV) property when printed. The dual metallic-like appearance (visible)/fluorescent (UV) performance is not an inherent property to a combination of ink base, naturally-derived pigment and fluorescent dye components. Ink components are selected herein to provide both properties. In combination the present fluorescent phase change ink compositions include:

(a) limited (low or none) overlapping between the absorption spectra of the ink base and/or pigment on one side and the absorption spectrum of the fluorescent dye. This enables the activating UV light to reach the fluorescent dye dispersed in the ink composition. Otherwise the fluorescent is not activated or the intensity of light is diminished significantly, therefore resulting in poor ink detection performance.

(b) limited (low or none) overlapping between the emission spectra of the ink base/pigment package with the emission of the fluorescent dye.

(c) invisible fluorescent dye, that is, colorless under normal ambient viewing light when the objective is minimal or no change at all in the metallic color appearance.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed, including plain papers such as XEROX® 4024 papers, XEROX® Image Series papers, Courtland® 4024 DP® paper, ruled notebook paper, bond paper, silica coated papers such as Sharp Company silica coated paper, JuJo® paper, Hammermill® Laserprint Paper, and the like, transparency materials, fabrics, textile products, plastics, polymeric films, inorganic substrates such as metals and wood, and the like.

The present disclosure is also directed to a printer containing the phase change ink compositions described herein. Further, the present disclosure relates to an ink jet stick or pellet containing the phase change ink compositions described herein, as well as to a printer containing the ink jet stick or pellet.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Commercially available colorants (Alizarin Red S, Indigo), N,N-dimethyl dioctadecyl bromide were purchased from Sigma-Aldrich®. Arquad® 316 was obtained from Akzo Nobel. Alizarin Red S was modified using Arquad® 316, and the yield for the modified compound (COMPOUND 4) varies between 49% and 89% by weight. Indigo Carmine was modified using N,N-dimethyldioctadecyl ammoniumbromide and the yield for the modified compound (COMPOUND 1) was about 90% by weight. Indigo Carmine was also modified using cetyltrimethylammonium bromide and the yield for the modified compound (COMPOUND 2) was about 92%. Indigo Carmine was modified with Arquad® 316 and the yield for the modified compound (COMPOUND 3) was about 90%. The structure of the modified colorants is presented in Table 2 below:

TABLE 2
| Example # | Name | Structure | Counter ion used | Yield (%) |
|---|---|---|---|---|
| 1 | COMPOUND 1 | 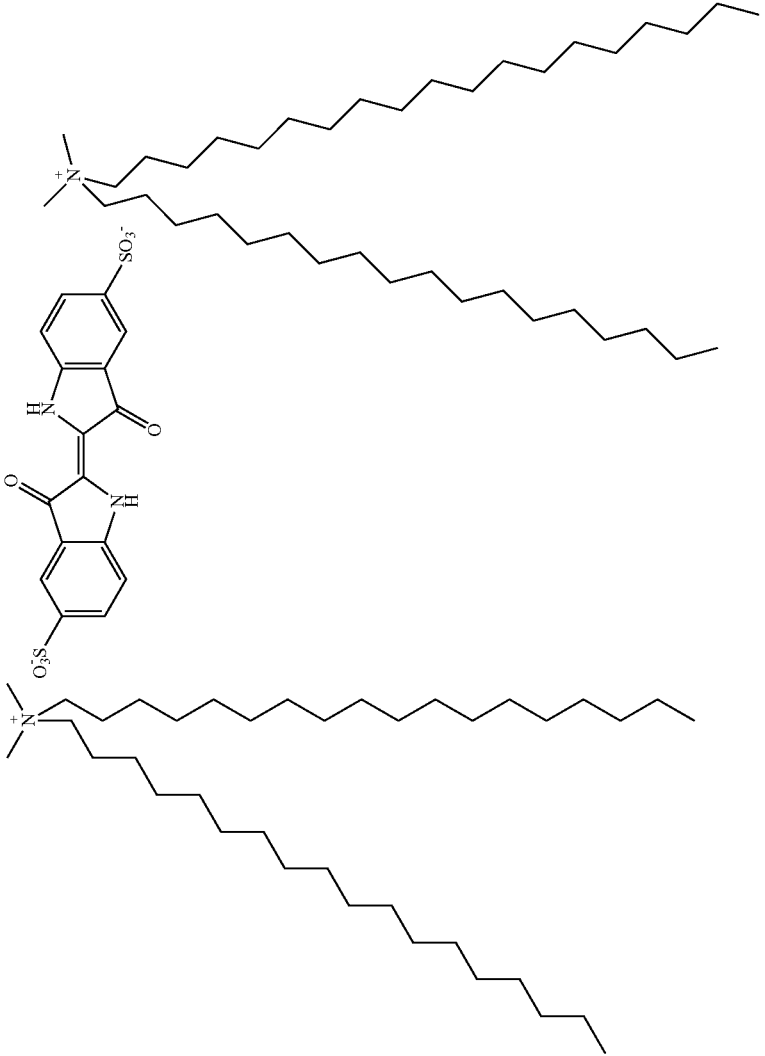 | N,N-dimethyl-dioctadecyl ammonium | 90 |

TABLE 2-continued

| Example # | Name | Structure | Counter ion used | Yield (%) |
|---|---|---|---|---|
| 2 | COMPOUND 2 | | Cetyltrimethyl-ammnoium | 92 |

TABLE 2-continued
| Example # | Name | Structure | Counter ion used | Yield (%) |
|---|---|---|---|---|
| 3 | COMPOUND 3 | 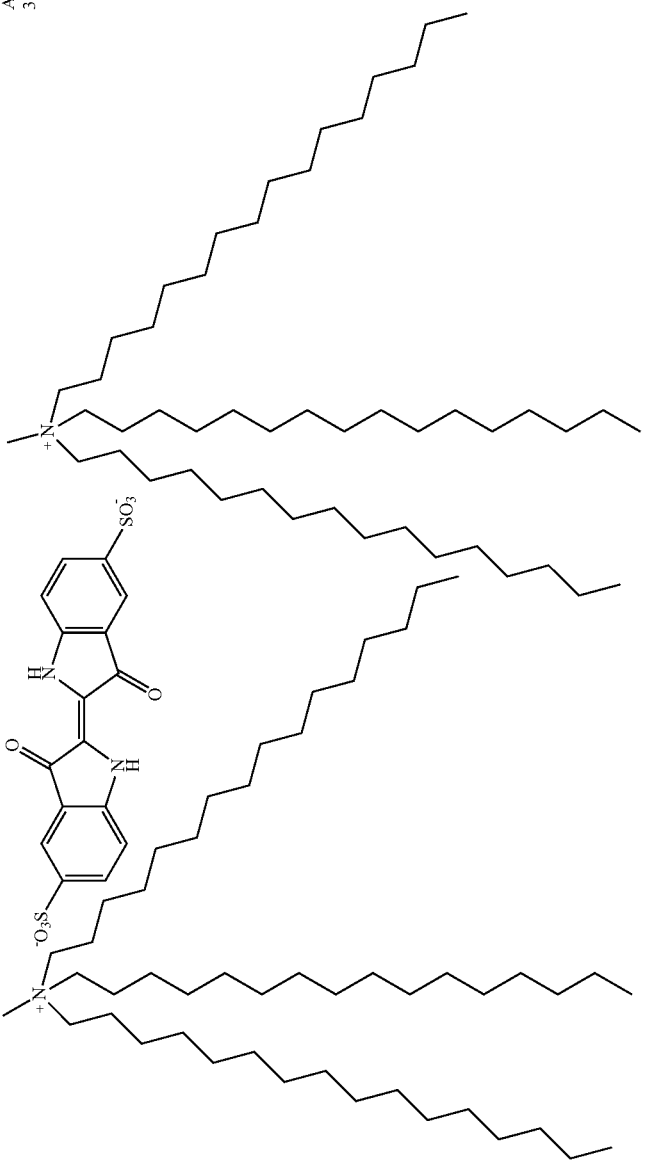 | Arquad ® 316 | 75 |

TABLE 2-continued
| Example # | Name | Structure | Counter ion used | Yield (%) |
|---|---|---|---|---|
| 4 | COMPOUND 4 | 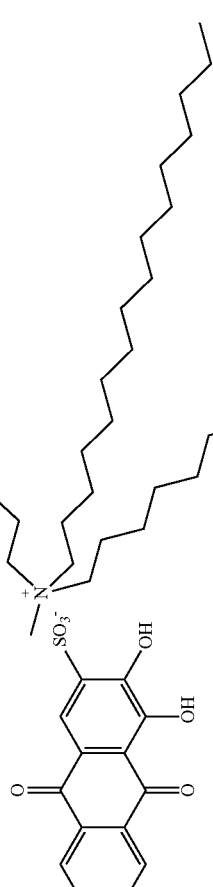 | Arquad ® 316 | 49 |

Ink components are presented in Table 3. The percentages in the ink formulation are based on weight.

TABLE 3

| Ink Base Component | Details |
|---|---|
| Polymethylene wax A | A fractionated polymethylene wax available from The International Group, Inc. |
| Polymethylene wax B | A fractionated polymethylene wax available from Nippon Seiro Co., Ltd. |
| Polyethylene wax C | A fractionated polyethylene wax available from The International Group Inc. |
| Triamide wax | As prepared in Example 1 of U.S. Pat. No. 6,860,930 |
| Kemamide ® S-180 | Stearyl stearamide available from Crompton Corporation |
| KE-100 | an ester of tetrahydroabietic acid and glycerol available from Arakawa Industries |
| Urethane resin | As prepared in example 4 of U.S. Pat. No. 6,309,453 |
| Naugard ® 445 | Antioxidant available from Crompton Corporation |

Also used in the examples is a dispersant prepared as described in Example 1 of U.S. Pat. No. 7,973,186, which is hereby incorporated by reference herein in its entirety, a wax as described in Example 4 of U.S. Pat. No. 6,309,453, which is hereby incorporated by reference herein in its entirety, a triamide wax as described in Example II of U.S. Pat. No. 6,860,930, which is hereby incorporated by reference herein in its entirety, and Solsperse® 17000, available from Lubrizol Corporation.

A dispersant prepared as described in Example 1 of U.S. Pat. No. 7,973,186, is prepared as follows. Into a 1 liter resin kettle fitted with heating mantle, mechanical stirring, Dean-Stark trap, reflux condenser and temperature sensor were introduced 192.78 grams (g) of Unicid® 700 (a long chain, linear carboxylic acid having an average carbon chain length of 48, available from Baker Petrolite) and 60.3 g of E-100® (a mixture of tetraethylenepentamine, (TEPA), pentaethylenehexamine (PEHA), hexaethyleneheptamine (HEHA), and higher molecular weight materials with a number-average molecular weight of 250 to 300 grams per mole, available from Huntsman. Under a stream of Argon, the temperature in the kettle was raised to 100° C. and the resin was allowed to melt. When the resin was completely melted, the temperature was gradually raised to 180° C. with stirring, and the reaction was allowed to proceed for 3 hours. 3.6 milliliters of water was collected into the Dean-Stark trap. The reaction was stopped, cooled down to 140° C. and discharged to an aluminum tray to give 249 g of the amide as a beige solid.

A urethane resin prepared as described in Example 4 of U.S. Pat. No. 6,309,453, is prepared as follows. About 80.0 grams (0.052 moles) of ARCOL LHT 112 (glycerol propoxylate available from ARCO Chemical Co.) and about 46.6 grams (0.156 moles) octadecyl isocyanate (Mondur O-Octadecyl Isocyanate available from Bayer Corporation) were placed in a 200 milliliter beaker with a magnet and heated to 115° C. with a silicone oil bath. Five drops of catalyst (Fascat® 4202, dibutyltindilaurate available from Elf Atochem North American, Inc.) were added and the mixture allowed to react for 2 hours at 115° C. An FT-IR of the reaction product showed the absence (disappearance) of a peak at ~2285 cm$^{-1}$ (NCO) and the appearance (or increase in magnitude) of peaks at ~1740-1680 cm$^{-1}$ and ~1540-1530 cm$^{-1}$ corresponding to urethane frequencies. The final urethane product was then poured into a specimen jar and allowed to cool and harden. This final product was a solid at room temperature characterized by a viscosity of about 15.8 cPs as measured by a Ferranti-Shirley cone-plate viscometer at about 135° C. and a melting point of about 23.8° C. as measured by a Differential Scanning calorimetry using a DuPont 2100 calorimeter at a scan rate of 20° C./minute.

A triamide wax prepared as described in Example II of U.S. Pat. No. 6,860,930, is prepared as follows. To a 1,000 milliliter four-neck round bottom flask fitted with a Trubore stirrer, N$_2$ inlet, Dean-Stark trap with condenser and N$_2$ outlet and thermocouple-temperature controller was added 350.62 grams (0.3675 moles) of UNICID® 550 (a mono-acid obtained from Baker-Petrolite Corp., Cincinnati, Ohio, of the formula CH$_3$(CH$_2$)$_n$COOH, wherein n has an average value of about 37 and is believed to have a range of from about 34 to about 40) and 0.79 grams of NAUGARD® 524 (antioxidant obtained from Uniroyal Chemical Company, Inc., Middlebury, Conn.). The mixture was heated to 115° C. to melt and stirred at atmospheric pressure under N$_2$. 51.33 grams (0.1167 moles) of JEFF AMINE® T-403 (mixture of triamines obtained from Huntsman Corporation, Houston, Tex., of the formula

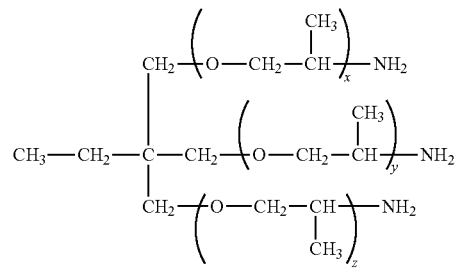

wherein x, y, and z are each integers representing the number of repeat propyleneoxy units, wherein x, y, and z may each be zero, and wherein the sum of x+y+z is from about 5 to about 6) was then added to the reaction mixture, and the reaction temperature was increased to 200° C. gradually over 0.5 hour and held at that temperature for another 3 hours. Some water was carried out by slow blowing N$_2$ and condensed into the trap when the mixture temperature reached about 180° C. The trap and condenser were then removed, and vacuum (about 25 mm Hg) was applied for about 0.5 hour and then released. The liquid product was cooled down to about 150° C. and poured onto aluminum to solidify. The resulting product was believed to be of the formula

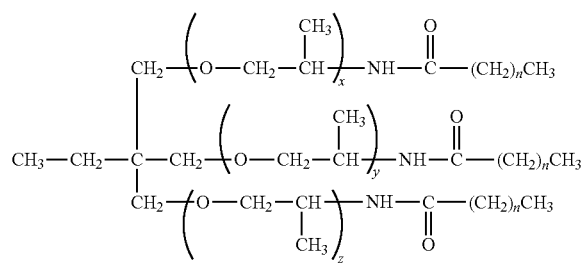

wherein n, x, y, and z are as defined hereinabove in this Example.

Example 1

Compound 1, shown in Table 2, a modified indigo carmine, was prepared as follows. To a 1,000 milliliter beaker fitted with magnetic stirring and heating were introduced 500 milliliters deionized water and 15 grams (0.032 mol) of Indigo Carmine. The temperature was raised to 80° C. and 47.4 grams (0.076 mol) of N,N-dimethyldioctadecylammonium bromide were added to the solution. The mixture was heated at 80° C. for 2 hours. The purple solid was isolated via filtration using a glass frit while the mixture was still hot. After the product was allowed to air dry, 43 grams (90%) of a purple powder were obtained.

Example 2

Compound 2, shown in Table 2, a modified indigo carmine was prepared as follows. To a 500 milliliter beaker fitted with magnetic stirring and heating were introduced 200 milliliters deionized water and 5 grams (0.011 mol) of Indigo Carmine. The temperature was raised to 80° C. and 7.81 grams (0.021 mol) of cetyltrimethylammonium bromide were added to the solution. The mixture was heated at 80° C. for 2 hours. The purple solid was isolated via filtration using a glass frit while the mixture was still hot. After the product was allowed to air dry, 9.8 grams (92%) of a dark purple powder were obtained.

Example 3

Compound 3, shown in Table 2, a modified Indigo Carmine with Arquad® 316, was prepared as follows. To a 1000 milliliter beaker fitted with magnetic stirring and heating were introduced 500 milliliters deionized water and 15 grams (0.032 mol) of Indigo Carmine. The temperature was raised to 80° C. and 23.7 grams (0.038 mol) of Arquad® 316 were added to the solution. The mixture was heated at 80° C. for 2 hours. The purple solid was isolated via filtration using a glass frit while the mixture was still hot. The compound was washed on the frit twice with 200 milliliter distilled water. After the product was allowed to air dry, 27.5 grams (75%) of a violet powder were obtained.

Example 4

Compound 4, shown in Table 2, a modified Alizarin Red S, was prepared as follows. Into a 500 milliliter beaker fitted with magnetic stirring, heating mantel were introduced 250 milliliters distilled water, 8 grams (0.023 mol) Alizarin Red S. Once the Alizarin Red S was dissolved, to the solution were added 16.9 grams (0.023 mol) Arquad® 316. The temperature was raised to 80° C. and the mixture was allowed to stir for an hour. Most of the liquid was decanted and the remaining gel was taken in 300 milliliter hexanes. The resultant water was separated using a separatory funnel. The resultant yellow hexanes solution was dried over magnesium sulfate, and the liquid was separated by filtration using a Buchner funnel. After the removal of the solvent ion vacuo, 11.52 grams (49%) of a dark green pasty solid were obtained.

Example 5

Solid Ink Base. The following materials were weighed in a 600 milliliter beaker such that the accompanying weight percentages also include the pigment and dispersant that were added in subsequent mixing step: 80.12 grams (50.08%) of polymethylene wax A, 23.1 grams (14.44%) triamide wax, 24 grams (15%) of a KEMAMIDE® S180, 23.1 grams (14.44%) KE-100 resin, 4 grams (2.5%) urethane resin, 0.496 grams (0.31%) NAUGARD® 445, The materials were melted in an oven at 120° C. The ink base was allowed stirring for 1 hour and filtered with a 5 micron stainless steel mesh using a KST-47 filtration apparatus, commercially available from Advantec MFS. Inc.

Example 6

Pigmented Solid Ink Containing Modified Indigo Carmine Compound 1 and a dispersant as described in Example 1 of U.S. Pat. No. 7,973,186. The following materials were weighed in a 600 milliliter beaker such that the accompanying weight percentages also include the pigment and dispersant that were added in subsequent mixing step: 80.12 grams (50.08%) of polymethylene wax A, 23.1 grams (14.44%) triamide wax, 24 grams (15%) of KEMAMIDE® S180, 23.1 grams (14.44%) KE-100 resin, 4 grams (2.5%) urethane resin, 0.496 grams (0.31%) NAUGARD® 445, and 2.304 grams (1.44%) of dispersant (prepared as described in Example 1 of U.S. Pat. No. 7,973,186, which is hereby incorporated by reference herein in its entirety). The materials were melted in an oven at 120° C., mixed well, then transferred to a Szegvari 01 attritor, available from Union Process, that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Modified Indigo Carmine Compound 1 of Example 1. The pigmented ink was allowed to attrite at 300 revolutions per minute (RPM) for 20 hours upon which the final attrited mixture was isolated from the stainless steel balls and filtered with a 5 micron stainless steel mesh using a KST-47 filtration apparatus, commercially available from Advantec MFS. Inc.

Example 7

Pigmented Solid Ink Containing Modified Indigo Carmine Compound 1 and dispersant as described in Example 1 of U.S. Pat. No. 7,973,186. The Ink of Example 2 was prepared as in Example 1 except that the milling time was increased from 20 hours to 42 hours.

Example 8

Pigmented Solid Ink containing Modified Indigo Carmine Compound 1 and Solsperse® 17000. The following materials were weighed in a 600 milliliter beaker such that the accompanying weight percentages also include the pigment and dispersant that were added in subsequent mixing step: 80.12 grams (50.08%) of polymethylene wax A, 23.1 grams (14.44%) triamide wax, 24 grams (15%) of KEMAMIDE® S180, 23.1 grams (14.44%) KE-100 resin, 4 grams (2.5%) urethane resin, 0.496 grams (0.31%) NAUGARD 445 and 2.304 grams (1.44%) of SOLSPERSE® 17000. The materials were melted in an oven at 120° C., mixed well, then transferred to a Szegvari 01 attritor, available from Union Process, that was also heated to 120° C., and charged with 1800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Modified Indigo Carmine Compound 1 of Example 1. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 9

Pigmented Solid Ink containing Modified Alizarin Red S Compound 4. A molten and thoroughly mixed blend consisting of parts (84.7 grams) (52.94%) of a polymethylene wax A, 23.7 grams (14.82%) triamide wax, 21.5 grams (13.42%) KE-100 resin, 22.8 grams (14.25%) KEMAMIDE® S180, 1.44 grams (0.9%) urethane resin, and 0.256 grams (0.17%) NAUGARD® 445 were placed into a 600 milliliter beaker on top of a hot plate and allowed to stir for 1 hour at 120° C. To this were slowly added, 5.616 grams (3.51%) Modified Alizarin Red S Dye Compound 4 of Example 4. The resultant ink was stirred for 2.5 hours at 120° C. and then was filtered through a 5 μm stainless steel mesh.

Comparative Example 10

Pigmented Solid Ink containing Modified Indigo Carmine Compound 2 and dispersant as described in Example 1 of U.S. Pat. No. 7,973,186. The following materials were weighed in a 600 milliliter beaker such that the accompanying weight percentages also include the pigment and dispersant that were added in subsequent mixing step: 80.12 grams (50.08%) of polymethylene wax A, 23.1 grams (14.44%) triamide wax, 24 grams (15%) of KEMAMIDE® S180, 23.1 grams (14.44%) KE-100 resin, 4 grams (2.5%) urethane resin, 0.496 grams (0.31%) NAUGARD® 445, and 2.304 grams (1.44%) of a dispersant (prepared as described in Example 1 of U.S. Pat. No. 7,973,186. The materials were melted in an oven at 120° C., mixed well, then transferred to a Szegvari 01 attritor, available from Union Process, that was also heated to 120° C., and charged with 1800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Modified Indigo Carmine Compound 2 of Example 2. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Comparative Example 11

Pigmented Solid Ink containing Modified Indigo Carmine Compound 2 and SOLSPERSE® 17000. The following materials were weighed in a 600 milliliter beaker such that the accompanying weight percentages also include the pigment and dispersant that were added in subsequent mixing step: 80.12 grams (50.08%) of polymethylene wax A, 23.1 grams (14.44%) triamide wax, 24 grams (15%) of KEMAMIDE® S180, 23.1 grams (14.44%) KE-100 resin, 4 grams (2.5%) urethane resin, 0.496 grams (0.31%) NAUGARD® 445, and 2.304 grams (1.44%) of SOLSPERSE® 17000. The materials were melted in an oven at 120° C., mixed well, then transferred to a Szegvari 01 attritor, available from Union Process, that was also heated to 120° C., and charged with 1800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Modified Indigo Carmine Compound 2 of Example 2. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 12

Pigmented Solid Ink containing Modified Indigo Carmine Compound 3 and dispersant as described in Example 1 of U.S. Pat. No. 7,973,186. The following materials were weighed in a 600 milliliter beaker such that the accompanying weight percentages also include the pigment and dispersant that were added in subsequent mixing step: 80.12 grams (50%) of polymethylene wax A, 23.1 grams (14.4%) triamide wax, 24 grams (15%) of KEMAMIDE® S180, 23.1 grams (14.4%) KE-100 resin, 4 grams (2.5%) urethane resin (prepared as described in Example 4 of U.S. Pat. No. 6,309,453), 0.496 grams (0.31%) Naugard® 445, and 2.304 grams (1.44%) of polymeric dispersant of dispersant (prepared as described in Example 1 of U.S. Pat. No. 7,973,186, which is hereby incorporated by reference herein in its entirety). The materials were melted in an oven at 120° C., mixed well, then transferred to a Szegvari 01 attritor, available from Union Process, that was also heated to 120° C., and charged with 1800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Modified Indigo Carmine Compound 3 of Example 3. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 13

Pigmented Solid Ink containing Modified Indigo Carmine Compound 3 and SOLSPERSE 17000. The following materials were weighed in a 600 milliliter beaker such that the accompanying weight percentages also include the pigment and dispersant that were added in subsequent mixing step: 80.12 grams (50%) of polymethylene wax A, 23.1 grams (14.4%) triamide wax, 24 grams (15%) of KEMAMIDE® S180, 23.1 grams (14.4%) KE-100 resin, 4 grams (2.5%) urethane resin (prepared as described in Example 4 of U.S. Pat. No. 6,309,453), 0.496 grams (0.31%) Naugard® 445, and 2.304 grams (1.44%) of polymeric dispersant (SOLSPERSE 17000, available from The Lubrizol Corporation). The materials were melted in an oven at 120° C., mixed well, then transferred to a Szegvari 01 attritor, available from Union Process, that was also heated to 120° C., and charged with 1800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Modified Indigo Carmine Compound 3 of Example 3. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Comparative Example 14

Pigmented Solid Ink containing Alizarin Red S from Sigma-Aldrich®. The following materials were weighed in a 600 milliliter beaker such that the accompanying weight percentages also include the pigment and dispersant that were added in subsequent mixing step: 80.12 g (50%) of polymethylene wax A, 23.1 grams (14.4%) triamide wax, 24 grams (15%) of KEMAMIDE® S180, 23.1 grams (14.4%) KE-100 resin, 4 grams (2.5%) urethane resin, 0.496 grams (0.31%) Naugard® 445, and 2.304 grams (1.44%) of polymeric dispersant (Solsperse® 17000, available from The Lubrizol Corporation). The materials were melted in an oven at 120° C., mixed well, then transferred to a Szegvari 01 attritor, available from Union Process, that was also heated to 120° C., and charged with 1800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Alizarin Red S as obtained from Sigma-Aldrich®. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Comparative Example 15

Pigmented Solid Ink containing Indigo Carmine from Sigma-Aldrich® and Solsperse® 17000. The following materials were weighed in a 600 milliliter beaker such that the accompanying weight percentages also include the pigment and dispersant that were added in subsequent mixing step: 80.12 grams (50%) of polymethylene wax A, 23.1 grams (14.4%) triamide wax, 24 grams (15%) of KEMAMIDE® S180, 23.1 grams (14.4%) KE-100 resin, 4 grams (2.5%) urethane resin, 0.496 grams (0.31%) Naugard® 445, and 2.304 grams (1.44%) of polymeric dispersant (Solsperse® 17000, available from Lubrizol Corporation). The materials were melted in an oven at 120° C., mixed well, then transferred to a Szegvari 01 attritor, available from Union Process, that was also heated to 120° C., and charged with 1800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Indigo Carmine as obtained from Sigma-Aldrich®. The pigmented ink was allowed to attrite at 300 RPM for 20 hours upon which the final attrited mixture was isolated from the stainless steel balls to be filtered. The ink did not go through the filter at all (not even one gram) at 1.5 pounds per square inch (psi). Although the applied pressure was increased to more than 10 psi, the ink could not be filtered. It was apparent that a gel layer had formed on top of the stainless steel mesh during filtration impeding the flow of ink through filter.

Example 16

Pigmented solid ink containing modified indigo carmine Compound 2 and dispersant as described in Example 1 of U.S. Pat. No. 7,973,186 with incorporation of biodegradable wax. The following materials were weighed in a 600 milliliter beaker such that the accompanying weight percentages also include the pigment and dispersant that were added in subsequent mixing step: 80.12 grams (50%) of polyethylene biodegradable wax, 23.1 grams (14.4%) triamide wax, 24 grams (15%) of KEMAMIDE® S180, 23.1 grams (14.4%) KE-100 resin, 4 grams (2.5%) urethane resin, 0.496 grams (0.31%) Naugard® 445, and 2.304 grams (1.44%) of dispersant (prepared as described in Example 1 of U.S. Pat. No. 7,973,186. The materials were melted in an oven at 120° C., mixed well, then transferred to a Szegvari 01 attritor, available from Union Process, that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of modified indigo carmine of Example 2. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 17

Pigmented solid ink containing modified indigo carmine Compound 2 and Solsperse® 17000 dispersant with incorporation of biodegradable wax. The following materials were weighed in a 600 milliliter beaker such that the accompanying weight percentages also include the pigment and dispersant that were added in subsequent mixing step: 80.12 grams (50%) of polyethylene biodegradable wax, 23.1 grams (14.4%) triamide wax, 24 grams (15%) of KEMAMIDE® S180, 23.1 grams (14.4%) KE-100 resin, 4 grams (2.5%) urethane resin, 0.496 grams (0.31%) Naugard® 445, Crompton Corporation), and 2.304 grams (1.44%) of polymeric dispersant (Solsperse® 17000, available from Lubrizol Corporation). The materials were melted in an oven at 120° C., mixed well, then transferred to a Szegvari 01 attritor, available from Union Process, that was also heated to 120° C., and charged with 1800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Modified Indigo Carmine Compound 1 of Example 1. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 18

Pigmented solid ink containing modified Alizarin Red S with incorporation of biodegradable wax. A molten and thoroughly mixed blend consisting of 52.94 parts (84.7 grams) of a polyethylene biodegradable wax, 14.82 parts (23.7 grams) triamide wax, 13.42 parts (21.5 grams) KE-100 resin, 14.25 parts (22.8 grams) KEMAMIDE® S180, 0.9 parts (1.44 grams) urethane, and 0.17 parts (0.256 grams) Naugard® 445, were placed into a 600 milliliter beaker on top of a hot plate and allowed to stir for 1 hour at 120° C. To this were slowly added 3.51 parts (5.616 grams) Modified Alizarin Red S Dye of Example 5. The resultant ink was stirred for 2.5 hours at 120° C. and then was filtered through a 5 μm stainless steel mesh.

Table 4 provides a summary of ink Examples 6-13, Comparative Examples 14 and 15, and Examples 16-18.

TABLE 4

| Example | Colorant | Dispersant | Poly-alkylene wax | Color on print |
|---|---|---|---|---|
| 6 | COMPOUND 1 | [1]Dispersant 1 | WAX A | greyish |
| 7 | COMPOUND 1 | [1]Dispersant 1 | WAX A | Greenish gray |
| 8 | COMPOUND 1 | Solsperse ® 17000 | WAX A | Lilac violet |
| 9 | COMPOUND 4 | none | WAX A | Golden yellow |
| 10 | COMPOUND 2 | [1]Dispersant 1 | WAX A | Greyish blue |
| 11 | COMPOUND 2 | Solsperse ® 17000 | WAX A | purple |
| 12 | COMPOUND 3 | [1]Dispersant 1 | WAX A | Pale bluish-violet |
| 13 | COMPOUND 3 | Solsperse ® 17000 | WAX A | Pale bluish-violet |
| Comparative 14 | Alizarin Red S | Solsperse ® 17000 | WAX A | Burnt orange (in ink; not printed) |
| Comparative 15 | Indigo Carmine | Solsperse ® 17000 | WAX A | Dark purple (in ink; not printed) |
| 16 | COMPOUND 2 | [1]Dispersant 1 | WAX C | Light purple |
| 17 | COMPOUND 2 | Solsperse ® 17000 | WAX C | Dark denim blue (in ink; not printed) |
| 18 | COMPOUND 4 | none | WAX C | Golden yellow |

[1]Dispersant 1 is a dispersant prepared as described in Example 1 of U.S. Pat. No. 7,973,186.

Ink Characterization Results.

Rheology.

A shear viscosity profile was determined at 110° C. using a 50 millimeter cone and plate geometry on a RFS-RII Rheometer, obtained from Rheometrics Corporation, now TA Instruments. The shear viscosities at 1 and 100 s$^{-1}$ were determined from the shear rate sweep extending from 1 to approximately 251.2 s$^{-1}$. An appropriate target viscosity range of the ink is approximately 8 to approximately 12 centipoise and better Newtonian behavior is realized when the difference of the viscosities at each of these comparative shear rates, such as 1 and 100 s$^{-1}$ are minimized, such as being less than about 1 centipoise, such as being less than about 0.5 centipoise or zero. The rheology studies indicate that the novel inks of the present disclosure displayed Newtonian behavior and are therefore very suitable to be used as phase change ink jet inks. The viscosity of ink Examples 5, 6, 7, 8, 9 and 15 at 1 and 100 s$^{-1}$ is summarized in Table 5.

TABLE 5

| Example | Modified Natural Colorant | Dispersant | Poly-alkylene wax | Viscosity at 1 s$^{-1}$ (cps) | Viscosity at 100 s$^{-1}$ (cps) |
|---|---|---|---|---|---|
| 5 | COMPOUND 1 | [1]Dispersant 1 | WAX A | 12.83 | 12.30 |
| 6 | COMPOUND 1 | [1]Dispersant 1 | WAX A | 11.00 | 10.88 |
| 7 | COMPOUND 1 | Solsperse ® 17000 | WAX A | 12.71 | 12.41 |
| 8 | COMPOUND 4 | none | WAX A | 10.49 | 10.53 |
| 9 | COMPOUND 2 | none | WAX A | 13.18 | 13.15 |
| 15 | COMPOUND 2 | [1]Dispersant 1 | WAX B | 13.38 | 12.18 |
| 16 | COMPOUND 2 | Solsperse ® 17000 | WAX B | Very high | Very high |

[1]Dispersant 1 is a dispersant prepared as described in Example 1 of U.S. Pat. No. 7,973,186.

As can be seen in Table 5, the inks largely display Newtonian behavior and have viscosities in the range of about 10 to about 12 centipoise at 110° C.

Phase change inks of the present disclosure containing modified naturally-derived colorants were prepared and successfully jetted. The inks of the present disclosure were filterable, had good Newtonian quality, and appropriate viscosity at jetting temperature for jetting. The inks herein were jetted using a Xerox Phaser® 8860 printer. The inks of the present disclosure jetted well and also had very good jetting characteristics a day later while being held at 120° C. in a Xerox Phaser® 8860 printer. The ink of Example 7 was jettable and shows that the pigment has the ability to develop different colors with different dispersants.

Metallic-like ink examples were prepared as described in the Examples hereinabove.

Comparative Example 19

Pigmented solid ink containing modified indigo carmine and a dispersant prepared as described in Example 1 of U.S. Pat. No. 7,973,186. The following materials were weighed in a 600 milliliter beaker such that the accompanying weight percentages also include the pigment and dispersant that were added in subsequent mixing step: 80.12 grams (50%) of polymethylene wax B, 23.1 grams (14.4%) triamide wax, 24 grams (15%) of KEMAMIDE® S180, 23.1 grams (14.4%) KE-100 resin, 4 grams (2.5%) urethane resin, 0.496 grams (0.31%) Naugard® 445 (antioxidant), and 2.304 grams (1.44%) of a dispersant prepared as described in Example 1 of U.S. Pat. No. 7,973,186.

The materials were melted in an oven at 120° C., mixed well, then transferred to a 01 attritor, available from Union Process, that was also heated to 120° C., and charged with 1800 g 440 C type ⅛ inch diameter stainless steel balls. A heated impeller was attached to the assembly whereupon the impeller speed was adjusted such that the stainless steel balls at the top of the vessel began to tumble gently over each other. To this stirring solution were added 2.88 grams (1.8%) of modified indigo Carmine (Compound 1). The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec Corporation.

Example 20

Pigmented solid ink containing modified indigo carmine, fluorescent pigment DFYK-C7 and a dispersant prepared as described in Example 1 of U.S. Pat. No. 7,973,186. An ink formulation was prepared and processed as in Comparative Example 18, but with the addition of 3.2 grams (2%) fluorescent dye DFYK-C7 added to the final attrited ink which was already isolated from the stainless steel shots. The mixture allowed to stir for 1 hour at 120° C. and then was filtered through a 5 μm stainless steel mesh.

Example 21

Pigmented solid ink containing modified indigo carmine, fluorescent pigment DFSB-C0 and a dispersant prepared as described in Example 1 of U.S. Pat. No. 7,973,186. An ink formulation was prepared and processed as in Comparative Example 19, but with the addition of 3.2 grams (2%) fluorescent dye DFSB-C0 added to the final attrited ink which was already isolated from the stainless steel shots. The mixture allowed to stir for 1 hour at 120° C. and then was filtered through a 5 μm stainless steel mesh.

Example 22

Pigmented solid ink containing modified indigo carmine, fluorescent dye 2(2-hydroxyphenyl(benzothiazole) from Sigma-Aldrich and a dispersant prepared as described in Example 1 of U.S. Pat. No. 7,973,186. An ink formulation was prepared and processed as in Comparative Example 19, but with the addition of 3.2 grams (2%) fluorescent dye 2(2-hydroxyphenyl(benzothiazole) from Sigma-Aldrich added to the final attrited ink which was already isolated from the stainless steel shots. The mixture allowed to stir for 1 hour at 120° C. and then was filtered through a 5 μm stainless steel mesh.

Comparative Prophetic Example 23

Solid ink containing modified alizarin red S (Compound 4). A molten and thoroughly mixed blend consisting of 52.94 parts (84.7 grams) of a polyethylene wax A, 14.82 parts (23.7 grams) triamide wax, 13.42 parts (21.5 grams) KE-100 resin, 14.25 parts (22.8 grams) KEMAMIDE® S180, 0.9 parts (1.44 grams) urethane resin, and 0.17 parts (0.256 grams) Naugard® 445 is placed into a 600 milliliter beaker on top of a hot plate and is allowed to stir for 1 hour at 120° C. To this are slowly added, 3.51 parts (5.616 grams) modified alizarin red S (Compound 4). The resultant ink is stirred for 2.5 hours at 120° C. and then is filtered through a 5 μm stainless steel mesh.

Example 24

Solid ink containing modified alizarin red S (Compound 4) and fluorescent additive. An ink formulation was prepared and processed as described in Comparative Prophetic Example 23 but with the addition of 3.2 grans (2%) fluorescent dye DFKY-C7. The mixture was allowed to stir for 1.5 hours at 120° C. and was then filtered through a 5 μm stainless steel mesh.

Control samples containing 2% fluorescent materials dispersed in the ink base were also prepared by mixing the amount of fluorescent additive with molten ink base from Example 5 and stirring for 30 minutes. Samples for UV-VIS spectroscopy were prepared by sandwiching test inks in between quartz slides. UV-VIS spectra of these samples as well as emission of the fluorescent sample were recorded. Blue, green and red emitting invisible fluorescent dyes were selected by design for meeting the fluorescence requirements.

Figure 3:
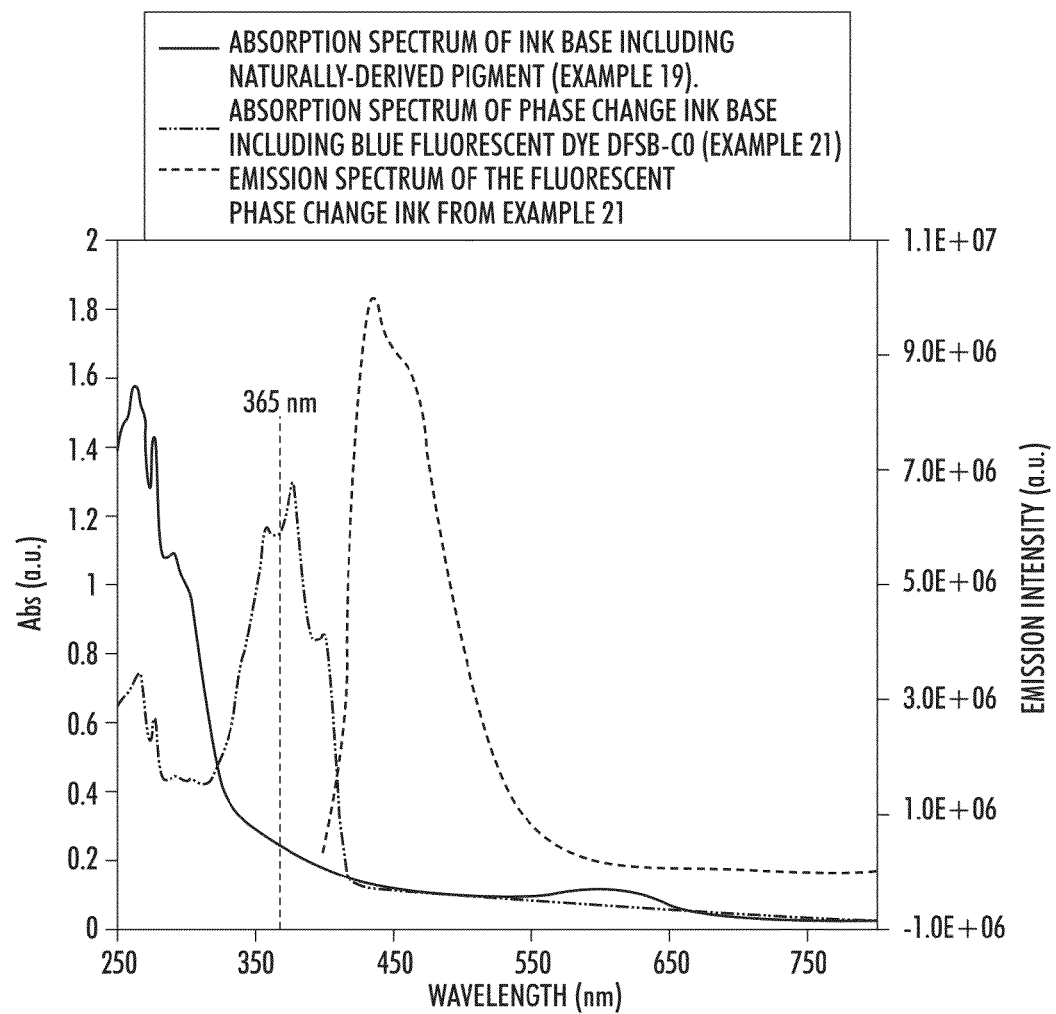
FIG. 3 is a graph showing absorption spectrum (a.u., y-axis) versus wavelength (m, x-axis) of an ink base including a naturally-derived pigment (Example 19), absorption spectrum of a phase change ink base including blue fluorescent dye DFSB-C0 (Example 21), and emission spectrum of the fluorescent phase change ink of Example 21.

FIG. 3 shows the absorption (UV-VIS) spectra of the solid ink base and pigment package of Example 6, the absorption spectrum of the invisible blue emitting fluorescent dye, DFSB-C0 (available from Risk Reactor) and the emission spectrum of the fluorescent dye, dispersed in ink base alone, of Comparative Example 5, for comparison. At the activating wavelength (365 nanometers UV light) the ink/pigment has minimal absorption while the fluorescent dye has strong absorption. This meets the requirement (a) limited (low or none) overlapping between the absorption spectra of the ink base and/or pigment on one side and the absorption spectrum of the fluorescent dye and therefore enables fluorescent dye activation during detection process. Furthermore, blue light is emitted at a wavelength of about 450 nanometers and is not absorbed by the ink/pigment package, therefore meeting requirement (b) limited (low or none) overlapping between the emission spectra of the ink base/pigment package with the emission of the fluorescent dye, and enabling easy detection. Finally the fluorescent dye has no significant absorption in the visible range of the spectrum therefore meeting requirement (c) invisible fluorescent dye, that is, colorless under normal ambient viewing light when the objective is minimal or no change at all of the metallic color appearance.

Figure 4:
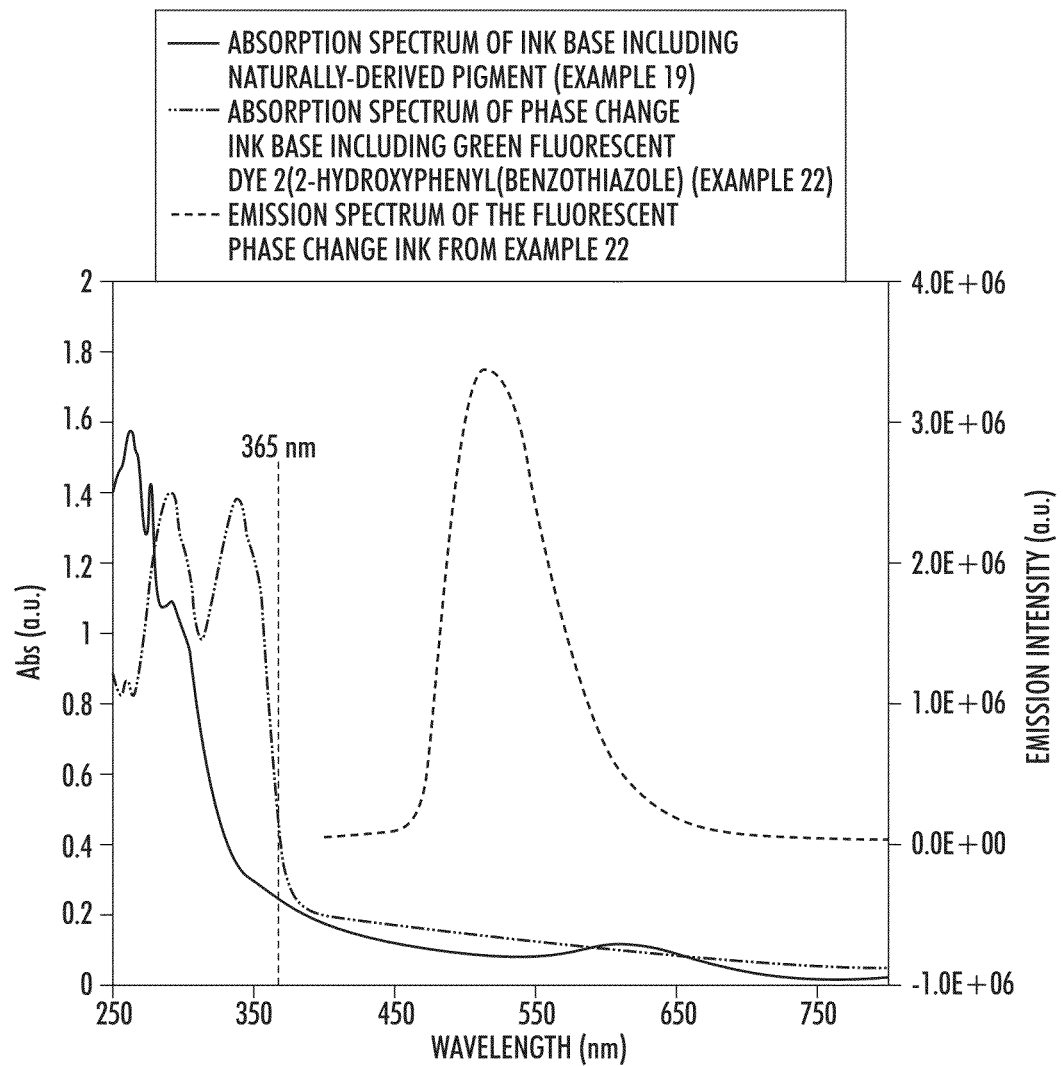
FIG. 4 is a graph showing absorption (a.u., y-axis) versus wavelength (m, x-axis) of an ink base including a naturally-derived pigment (Example 19), absorption spectrum of a phase change ink base including green fluorescent dye 2(2-hydroxyphenyl (benzothiazole) (Example 22, and emission spectrum of the fluorescent phase change ink of Example 22.

FIG. 4 shows that the green invisible fluorescent dye, 2(2-hydroxyphenyl(benzothiazole), available from Sigma-Aldrich, meets design requirements (a), (b) and (c). It emits green light at a wavelength centered at about 520 nanometers.

Figure 5:
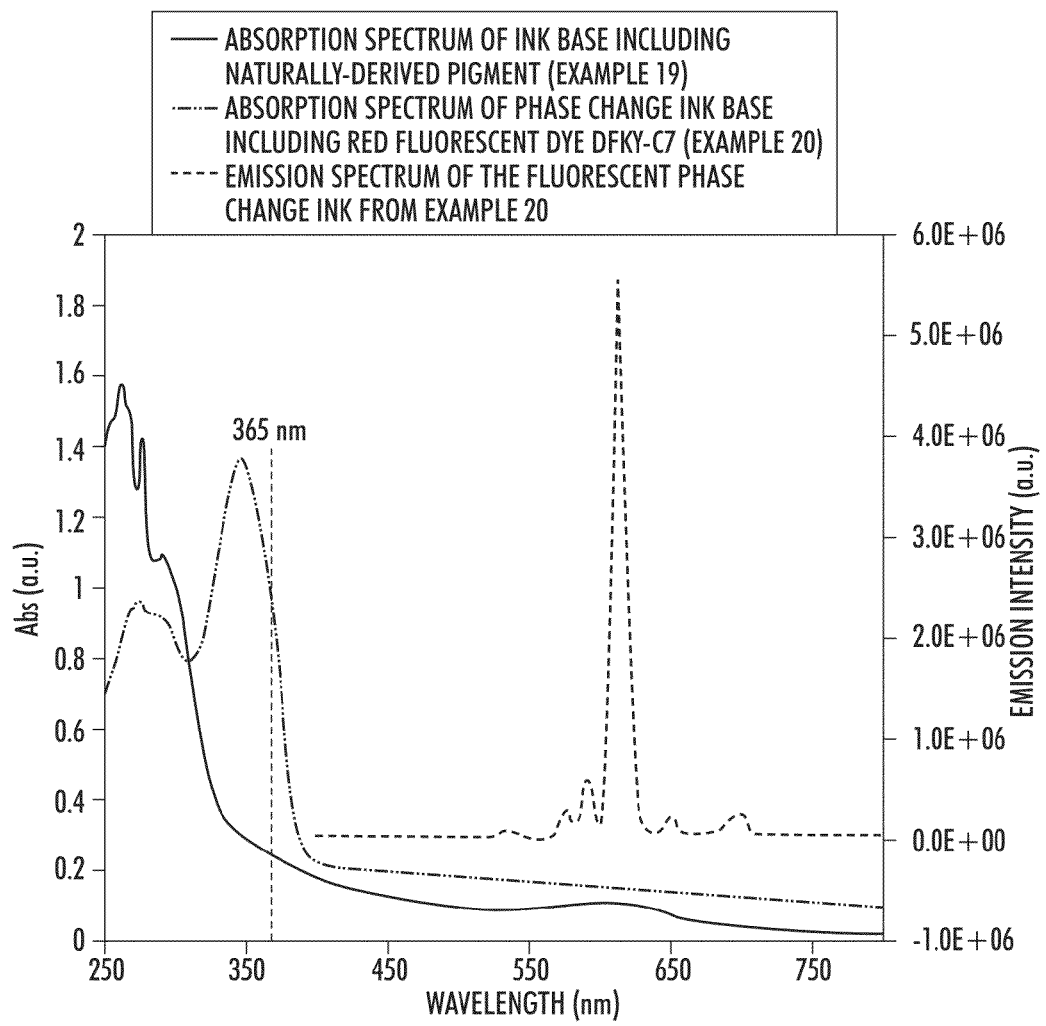
FIG. 5 is a graph showing absorption (a.u., y-axis) versus wavelength (m, x-axis) of an ink base including a naturally-derived pigment (Example 19), absorption spectrum of a phase change ink base including red fluorescent dye DFKY-C7 (Example 20), and emission spectrum of the fluorescent phase change ink of Example 20.

FIG. 5 shows that the red invisible fluorescent dye, DFKY-C7 available from Risk reactor, meets design requirements (a), (b) and (c). It emits red light at a wavelength centered at about 615 nanometers.

Thus, the dyes are shown to be fluorescent in a composition made with an ink base, a naturally derived pigment, as provided herein.

Figure 6:
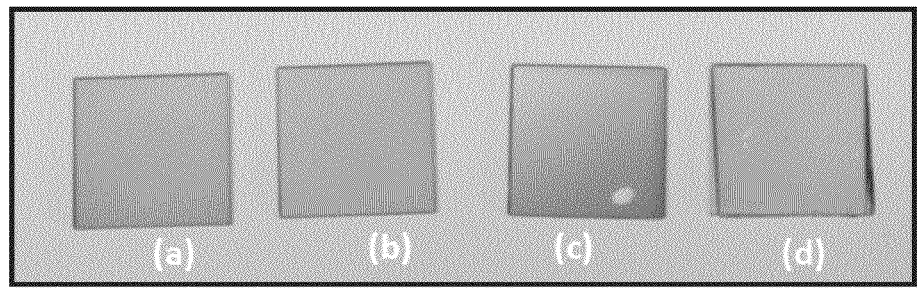
FIG. 6 is a picture showing quartz slides of fluorescent inks a, b, c, and d from Examples 20, 22, 21 and 19, respectively, seen under normal (ambient) viewing conditions.
Figure 7:
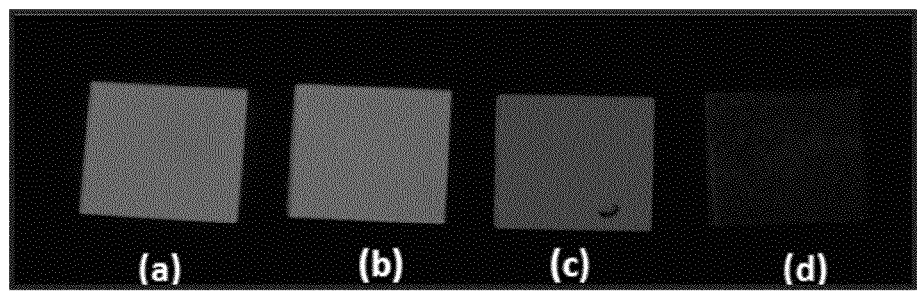
FIG. 7 is a picture showing quartz slides of fluorescent inks a, b, c, and d of FIG. 6 seen under ultra-violet light viewing conditions.

Test inks were prepared by heat dispersing 2% of fluorescent dyes into the solid ink composition of Example 18. Red (a), green (b), blue (c), and no fluorescent additive (d) samples were prepared by sandwiching test inks in between two quartz slides. Referring to FIG. 6, it is shown that under room light all the samples appear the same. When these same samples were viewed under UV light, however, each ink showed a different color: fluorescent samples emitted red, green and blue light respectively, while the ink without any fluorescent additive (d) showed no emitted light. This is shown in FIG. 7.

Print Demonstration.

The inks of Examples 20, 21, 22 containing naturally derived pigment and fluorescent additives package and ink from Example 6 containing only naturally derived pigment and no fluorescent additive were printed on a Xerox® Phaser® 8860 printer. A target was chosen such that different area coverages with differing densities were printed. One of the printed images show area coverages of the ink from 10% to 200% (incremental in steps of 10% area coverage) for the same ink done at a 525×450 dpi resolution and having a target drop mass of 25 nanograms. All of the inks jetted well and also had very good jetting characteristics a day later while being held at 130° C. in a Xerox® Phaser® 8860 printer. All of the inks were jetted on different paper substrates including black, blue, green, and yellow paper, Xerox® Color Xpressions Color Xpressions Plus, and Xerox Color Xpressions Plus 4200 paper substrates.

Figure 8:
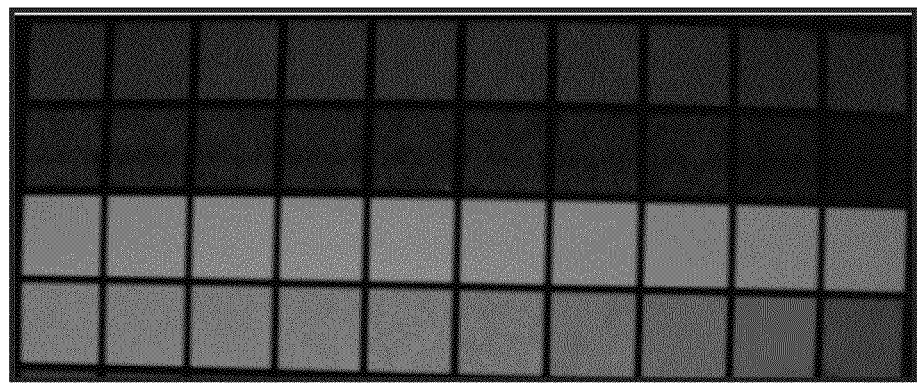
FIG. 8 is a print appearing silvery-grey printed from Example 20 ink containing a red fluorescent compound (bottom portion of print) and printed from Example 19 ink which has no fluorescent component (top portion of print).

FIG. 8 shows a print made with the red fluorescent ink of Example 20 on a black paper substrate, printed side-by-side with the same ink which had no fluorescent additive (Comparative Example 6). The strong red emission of the red fluorescent prints can be seen. Under the same conditions, the areas printed with the ink without fluorescent additive of Comparative Example 6 do not emit light.

Figure 9:
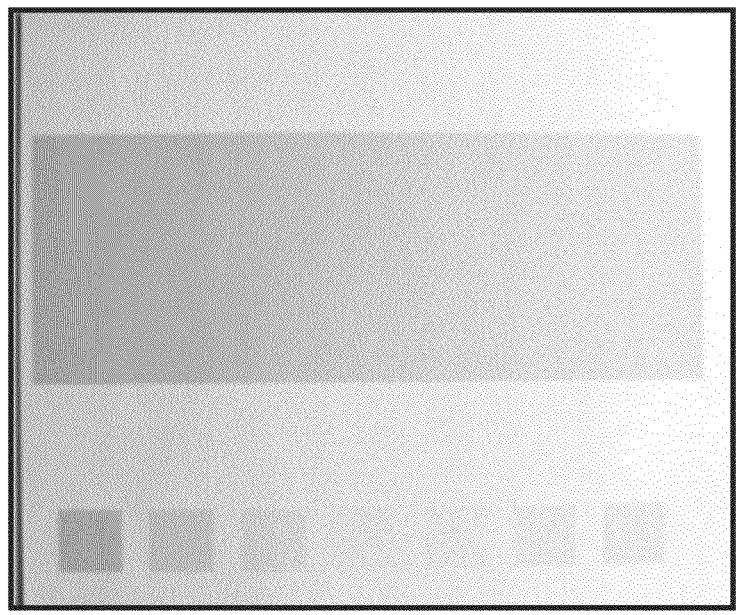
FIG. 9 is a print appearing silvery-grey printed on white paper from Example 20 containing a red fluorescent compound that was viewed under normal (ambient) room light.
Figure 10:
FIG. 10 is the print of FIG. 9 viewed under black light at 365 nanometers activating light.

In particular, the red invisible fluorescent solid ink is advantageous because it can be detected on various substrates, including all types of white paper that either fluoresce or do not fluoresce. FIGS. 9 and 10 depict metallic-like prints on white paper (Xerox® 4200) printed from the fluorescent sample of Example 20 under normal viewing light, the sample appears metallic-like as shown in FIG. 9. The same sample appears red when viewed under UV light as shown in FIG. 10.

Advantages of the present phase change ink compositions include, but are not limited to, that the modifiers of the colorants herein may also largely be naturally derived or bio-based. In certain embodiments, phase change inks herein contain modified naturally-derived colorants in biodegradable wax. In some embodiments, certain colorants of the present disclosure, for example, certain indigo carmine colorants, can be modified to prevent its gellation in solid ink. Various colors can be obtained from the modified naturally-derived colorants of the present disclosure. For example, in the case of modified indigo carmine, two different colors were obtained with use of two different dispersants: silvery grey when a dispersant (prepared as described in Example 1 of U.S. Pat. No. 7,973,186) was used and violet when Solsperse® 17000 was used. Further, in the case of Alizarin Red S, the color can be shifted from burnt orange for the ink containing the non-modified compound with Solsperse® 17000 to golden yellow for the ink containing the modified naturally-derived colorant with no dispersant. Optionally, additional colorant can be included in the phase change ink composition to further steer the color. The additional colorant can be selected from any suitable or desired known colorant suitable for use in phase change inks, a second modified naturally-derived colorant, or a mixture or combination thereof.

Further advantages include a novel ink composition comprising a solid ink base, a pigment (modified naturally-derived colorant) which when printed provides a metallic-like appearance, and a fluorescent dye. In embodiments, the ink composition provides dual security features: appears metallic under normal viewing light and emits bright colored light when examined under UV light. The fluorescent dye as part of a security ink of the invention is invisible when prints are viewed in normal viewing light. The metallic-like appearance of prints from such inks does not change when viewed under normal viewing light. The unique dual metallic and fluorescent features make the present compositions particularly suited for solid ink security inks and for providing security to transactional-promotional documents and to printed packages. In embodiments, the present solid ink formulations have security properties that hinder counterfeiting of printed documents printed with said ink (security printing, security ink). By adding fluorescent dye to the solid ink comprising modified naturally-derived colorant, the fluorescent dye provides a second set of security features to the security ink that provides a metallic like appearance when printed thus making it even more difficult to counterfeit documents printed with this ink. Advantages for the security printing industry include: 1) a security ink that can yield prints having a metallic-like appearance; 2) unlike most security features, it is printable on digital equipment so each page is fully customizable; 3) the ink can have some number of subtle variants to offer different customers slightly different inks as an added authentication feature.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition comprising:
an ink vehicle;
an optional dispersant;
a modified naturally-derived colorant comprising a naturally-derived colorant that is modified with an aliphatic quaternary salt, an olephenic quaternary salt, an aromatic quaternary salt, or a mixture or combination thereof;
an optional fluorescent dye; and
an optional synergist.

2. The phase change ink composition of claim 1, wherein the naturally-derived colorant is derived from a member of the group consisting of tetrapyrroles, tetra-terpenoids, quinines, O-heterocyclic compounds, N-heterocyclic compounds, metallo-proteins, lipofuscins, and fungal pigments; or wherein the naturally-derived colorant is derived from a member of the group consisting of Safflower, Caesalpina, Maddar, Kermes, Drago tree, Daemonorops, Cochineal, Lac, Bougainvillea, Golden rod, Teak, Marigold, Weld, Saffron, Parijata, Indigo, Woad, Suntberry, Pivet, molluscs, Murasaki, Water lily, Tulsi, Canna, Lily, Nettles, Balsam, Dahlia, Annatto, Balsam, Blackberries, Lac, Alder, Rofblamala, Custard apple, Harda, and mixtures and combinations thereof.

3. The phase change ink composition of claim 1, wherein the naturally-derived colorant is derived from a compound of the formula:

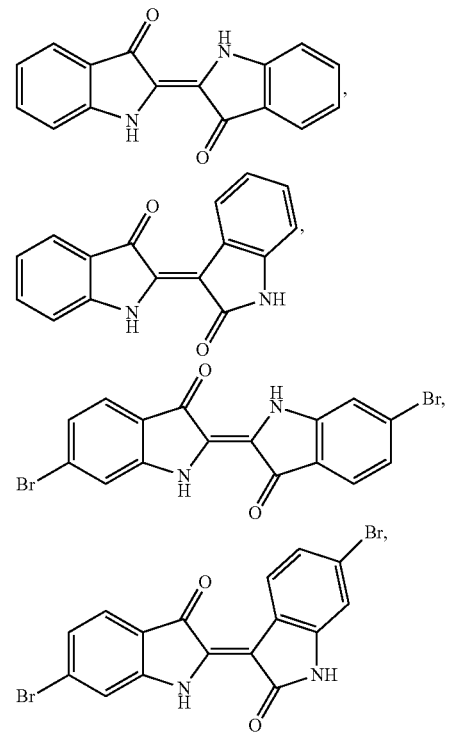

-continued

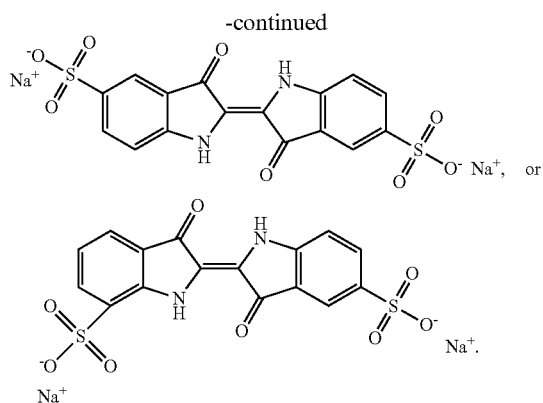

4. The phase change ink composition of claim 1, wherein the naturally-derived colorant is derived from a compound of the formula:

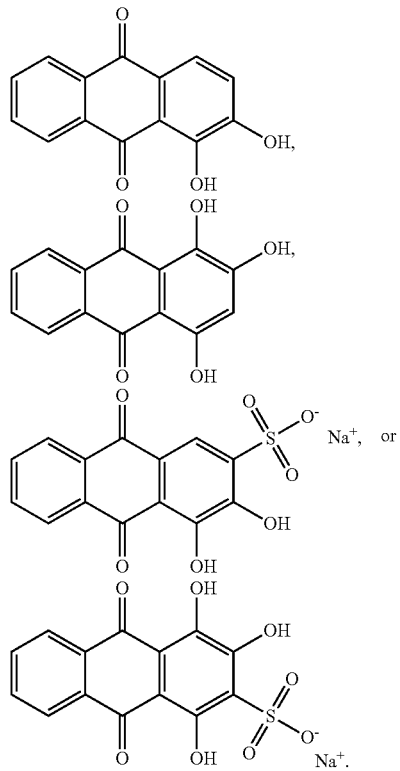

5. The phase change ink composition of claim 1, wherein the naturally-derived colorant is derived from an anthraquinoid of the formula

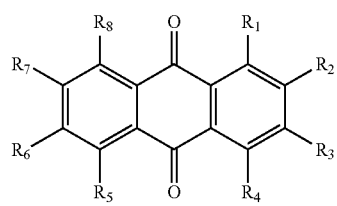

wherein $R_1$, $R_2$, $R_3$, $R_4$, $R_5$, $R_6$, and $R_8$ are each independently selected from the group consisting of hydrogen, $CH_3$, OH, and COOH; and wherein $R_7$ is selected from the group consisting of hydrogen, a compound of the formula

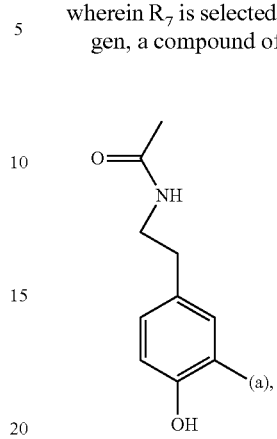

a compound of the formula

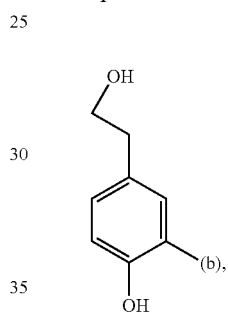

and a compound of the formula

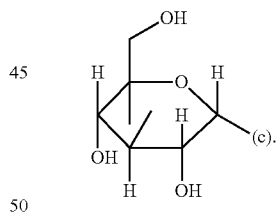

6. The phase change ink composition of claim 1, wherein the naturally-derived colorant is derived from a compound of the formula

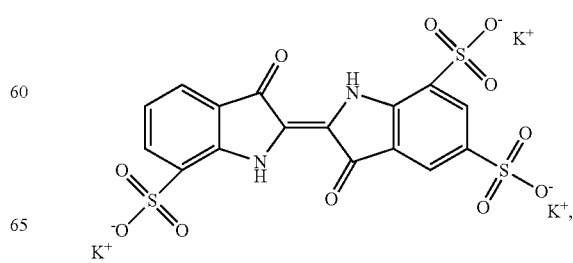

-continued

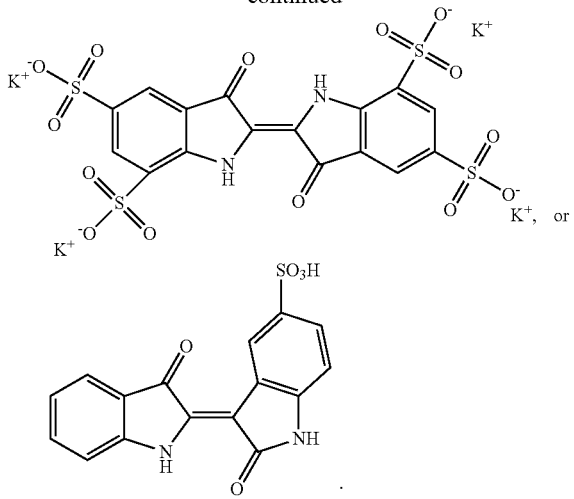

7. The phase change ink composition of claim 1, wherein the naturally-derived colorant is modified with an aliphatic quaternary ammonium salt, an aromatic quaternary ammonium salt, or a mixture or combination thereof.

8. The phase change ink composition of claim 1, wherein the naturally-derived colorant is modified with an aliphatic quaternary ammonium salt comprising an alkyl chain having at least eight carbon atoms.

9. The phase change ink composition of claim 1, wherein the naturally-derived colorant is modified with an aliphatic quaternary ammonium salt or aromatic quaternary ammonium salt selected from the group consisting of tetrabutylammonium, tetraoctyl ammonium, tetradodecylammonium, tetraoctadecylammonium, N,N-dimethyl dioctadecylammonium, N,N-dimethyl dioctyl ammonium, N,N-dimethyl dodecyl ammonium, N,N,N-trimethyl-1-docosanaminium, behenyl trimethylammonium, N-octadecyltrimethylammonium, and mixtures thereof.

10. The phase change ink composition of claim 1, wherein the naturally-derived colorant is modified with a compound of the formula

wherein R is a long chain alkyl group having at least 8 carbon atoms and X is a halogen.

11. The phase change ink composition of claim 1, wherein the naturally-derived colorant is modified with a compound selected from the group consisting of cocoalkyltrimethylammonium, didecyldimethylammonium, coco(fractionated) dimethylbenzylammonium, hexadecyltrimethylammonium, stearyltrimethylammonium, behenyltrimethylammonium, and salts thereof.

12. The phase change ink composition of claim 1, wherein the naturally-derived colorant is modified with an N-alkyl or N-aryl counterion of the formula

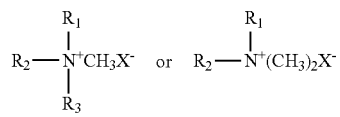

wherein $R_1$, $R_2$ and $R_3$ can be identical or different from one another and wherein each of $R_1$, $R_2$ and $R_3$ is independently selected from the group consisting of alkyl, alkoxy, aryl, and alkylaryl and wherein X is any halogen atom.

13. The phase change ink composition of claim 1, wherein the naturally-derived colorant is modified with a compound of the formula

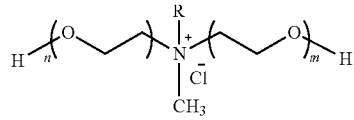

wherein R is H, $CH_3$, linear alkyl, branched alkyl, or alkoxyl; and wherein m and n are integers and wherein m+n ranges from 2 to 25; or wherein the naturally-derived colorant is modified with a compound of the formula

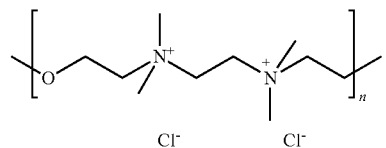

wherein n is from about 1 to about 30.

14. The phase change ink composition of claim 1, wherein the modified naturally-derived colorant is a compound of the formula

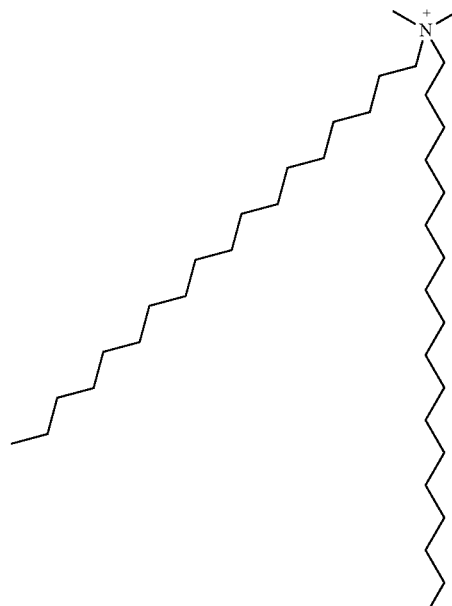

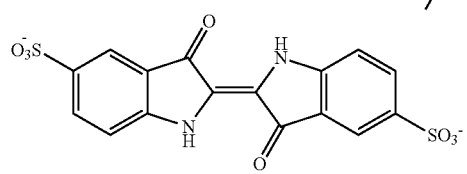

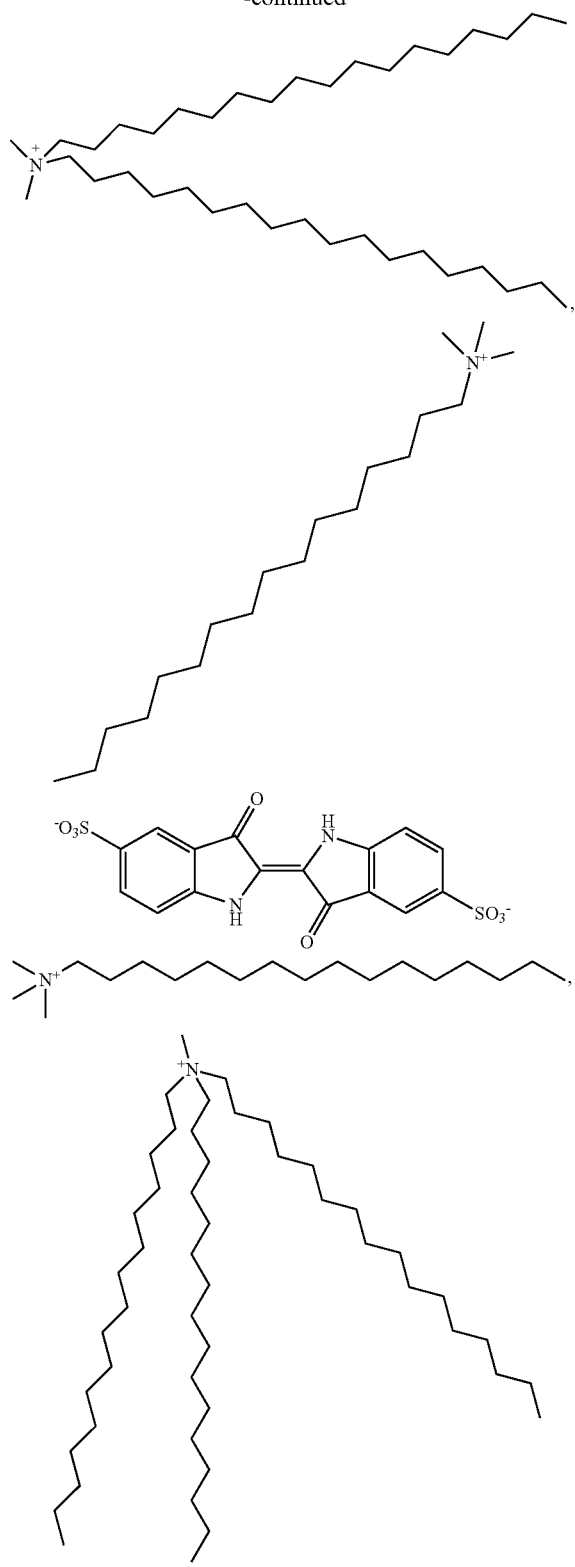

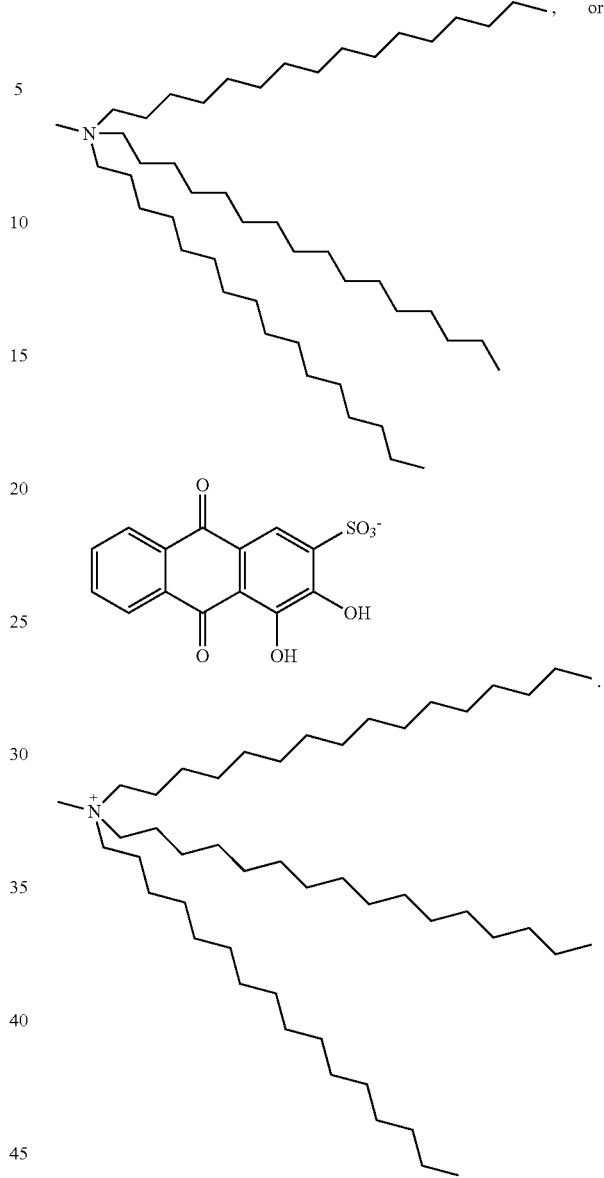

15. The phase change ink composition of claim 1, wherein the modified naturally-derived colorant is modified with an aliphatic quaternary ammonium salt, aromatic quaternary ammonium salt, or mixture or combination thereof, and wherein the aliphatic quaternary ammonium salt, aromatic quaternary ammonium salt, or mixture or combination thereof is biobased; or wherein the modified naturally-derived colorant is modified with an aliphatic quaternary ammonium salt, an aromatic quaternary ammonium salt, or mixture or combination thereof, wherein the aliphatic quaternary ammonium salt, the aromatic quaternary ammonium salt, or mixture or combination thereof contains an alkyl chain having more than 8 carbon atoms, and wherein the alkyl chain is biobased.

16. The phase change ink of claim 1, wherein the modified naturally-derived colorant is self-dispersible in a phase change ink vehicle.

17. The phase change ink of claim 1, wherein the fluorescent dye is selected from the group consisting of rhodamines, fluorescein, coumarins, napthalimides, benzoxanthenes, acridines, azos; DFSB class, DFPD class, DFSB-K, and mixtures and combinations thereof.

18. The phase change ink composition of claim 1, wherein the dispersant is selected to steer the color of the phase change ink.

19. A method comprising:
incorporating into an ink jet printing apparatus a phase change ink composition comprising an ink vehicle; an optional dispersant; and a modified naturally-derived colorant comprising a naturally-derived colorant that is modified with an aliphatic quaternary salt, an olephenic quaternary salt, an aromatic quaternary salt, or a mixture or combination thereof, an optional fluorescent dye, and an optional synergist;
melting the ink composition; and
causing droplets of the melted ink to be ejected in an imagewise pattern onto a substrate.

20. An ink jet printer stick or pellet comprising a phase change ink composition comprising an ink vehicle; an optional dispersant; and a modified naturally-derived colorant comprising a naturally-derived colorant that is modified with an aliphatic quaternary salt, an olephenic quaternary salt, an aromatic quaternary salt, or a mixture or combination thereof, an optional fluorescent dye, and an optional synergist.

* * * * *